US012138956B1

(12) United States Patent
Calascibetta

(10) Patent No.: US 12,138,956 B1
(45) Date of Patent: Nov. 12, 2024

(54) PAINT-EDGING HAND STEADYING DEVICE

(71) Applicant: Joseph J. Calascibetta, Port Jefferson Station, NY (US)

(72) Inventor: Joseph J. Calascibetta, Port Jefferson Station, NY (US)

( * ) Notice: Subject to any disclaimer, the term of this patent is extended or adjusted under 35 U.S.C. 154(b) by 0 days.

(21) Appl. No.: 18/132,370

(22) Filed: Apr. 8, 2023

(51) Int. Cl.
*B44D 3/22* (2006.01)

(52) U.S. Cl.
CPC ..................................... *B44D 3/22* (2013.01)

(58) Field of Classification Search
CPC ........................................................ B44D 3/22
See application file for complete search history.

(56) References Cited

U.S. PATENT DOCUMENTS 1,510,877 A * 10/1924 Wiedenmann .......... B43L 15/00 248/118.5
5,353,508 A * 10/1994 Baker ..................... B26B 29/06 30/294
5,730,711 A * 3/1998 Kendall ................ A61F 5/3723 248/118
5,832,832 A * 11/1998 Carsel ...................... B44D 3/00 101/406
9,829,147 B2 * 11/2017 Baker .................... A45D 29/00
10,300,592 B2 * 5/2019 Hayes ...................... B25G 3/36
11,097,411 B2 * 8/2021 Hayes ..................... A46B 5/021
2014/0263878 A1 * 9/2014 Moy .................. A47B 21/0371 248/118
2015/0108292 A1 * 4/2015 Baker .................... A45D 29/00 248/118
2016/0271785 A1 * 9/2016 Hayes .................... A46B 17/02
2021/0347033 A1 * 11/2021 Dyer .................... B43K 23/008

FOREIGN PATENT DOCUMENTS

GB 2526546 A * 12/2015 ............. B25G 1/102

* cited by examiner

*Primary Examiner* — Yaritza Guadalupe-McCall
(74) *Attorney, Agent, or Firm* — Intellectulaw, The Law Office of P.B. Tufariello P.C.; Panagiota Betty Tufariello

(57) ABSTRACT

A device capable of acting as a guide for a paint brush during a paint edging process. It comprises a hand-stabilizing support body and means for attaching it to the heel pad of the hand that will be holding the paint brush. The hand-stabilizing support body has a top part and an arcuate bottom, said top part having a proximate edge, a distal edge, two opposing shoulders, one shoulder being taller than the other, and an arched surface between said two shoulders, said arched surface and said opposing shoulders forming an upwardly facing concave cradle for the support of the heel pad, having a length that extends the length of said hand-stabilizing support body along its z-axis. During use the arcuate bottom of the hand-stabilizing supporting body beneath the brush, rests on, leans slightly into and moves along the wall, using the wall as support during the paint edging process.

16 Claims, 22 Drawing Sheets

PAINT-EDGING HAND STEADYING DEVICE

CROSS-REFERENCE TO RELATED APPLICATIONS

The present application claims no priority to any preceding application.

STATEMENT REGARDING FEDERALLY SPONSORED RESEARCH OR DEVELOPMENT

Not applicable.

BACKGROUND OF THE INVENTION

Field of Invention

The present invention is directed to the field of painting and art tools. It may also be directed to tools for use in occupational therapy, as well as tools for supporting and/or steadying a hand during repetitive and fatiguing activities. More particularly, it relates to a hand steadying device for use when "cutting-in with paint" in preparation for painting a wall or ceiling.

Prior Art

"Edging with a brush" or "cutting-in with the paint in preparation of rolling" is a technique commonly used when painting walls and ceilings with a paint roller. The process generally involves first using a paintbrush to paint a relatively straight, sharp line along ceiling lines, i.e, lines formed at junctures of walls and ceiling; wall lines, i.e., lines formed at junctures of two walls; and trim, before applying paint to the entire surface of the walls and ceiling using a roller. The lower edge of the painted straight line is feathered to provide a gradual transition between the old paint and the new paint. Feathering the bottom edge of the paint line along a ceiling line, or the outer edge of the paint line along a wall line eliminates any ridges or abrupt stops from one color to the other and provides for even distribution of the new paint color along the entire surface of the wall, edge to edge.

The process of "cutting in with paint in preparation of rolling", before painting an entire room using a roller, comprises a number of steps, including but not limited to: a) pouring about an inch or two of paint into a work bucket, from the paint container; b) optionally adding a little extender into the paint in the work bucket, if the paint is too thick; c) stirring the paint together with the extender to evenly distribute the extender throughout the paint, thereby creating a homogeneous paint mixture; d) loading the brush by dipping it into the paint/extender mixture in the work bucket, and thereafter taking some of the excess paint off, by tapping the brush or wiping it on the side of the work bucket back and forth; e) placing the brush at the ceiling line formed at the juncture of the wall and the ceiling (usually by using a ladder) and brushing along the ceiling line while holding the painting hand (the hand that is holding the paint brush, which is the right hand for individuals who are right-hand dominant), and arm steady while moving the body. Typically, the first pass of the paintbrush along the ceiling line will not generate a perfect line. A second pass of the paintbrush is needed to broaden and feather the painted line; f) finishing the cutting-in of the ceiling line; g) cutting-in the corners of the walls, keeping in mind that it is acceptable to overlap on the adjacent wall since all the walls of the room will be painted, and all lines painted must be feathered; h) cutting-in the baseboard; i) cutting around the opening of outlets and along the edges of windows; and h) completing all of the foregoing around the room rapidly. Painting slowly will result in crooked lines.

It is well known in the art that professional painters often cut-in such corners free-hand. See, e.g. International Application Publication Number WO2017082727A2 the contents of which are incorporated as if more fully set forth herein. This requires a steady hand and should be done with the necessary accuracy. To increase their painting accuracy professional painters will occasionally use painter's tape. As a result, free-hand cutting-in requires both skill and time.

The best way to hold a paintbrush during the "cutting-in" process, is by placing the thumb of the painting hand on one side of the paint brush, the forefinger right on the shoulder of the paintbrush and the remaining three on the other side of the paintbrush. In other words, the most stable grasp for precision and proper paint brush grip is a dynamic tripod grasp.

The dynamic tripod grasp involves both the radial and ulnar sides of the hand. The radial side of the hand, namely the thumb, index finger and middle finger is generally referred to as the precision side of the hand. The ulnar side of the hand, namely the ring finger and the little finger or the pinky is referred to as the power side of the hand.

To achieve a dynamic tripod grasp during painting, an individual must pinch the brush between the distal pads of the index finger and thumb and then rest the brush on the lateral distal interphalangeal joint of the middle finger. These three fingers together are the tripod. These three fingers supported by arches in the palm of the hand, utilize precise movements of rotation, flexion, and extension to achieve the small movements for fine motor activities requiring accuracy, such as those required by the "cutting-in" process. In addition, the space between the thumb and index finger, namely the web space, must be maintained in an open and semi-circular (open "c") manner to support the dynamic movements of the tripod fingers. The ulnar side of the hand, in turn, needs to stay in a flexed and quieter position so as to provide a stable base of support from which the tripod can move.

When engaged in the cutting-in with paint process the painter is usually on a ladder, holding the brush up at an angle to paint the ceiling and corresponding wall lines. The wrist is bent up or down above the head, placing tension on the central palmar area of the hand, and undue pressure on the ulnar and median nerves, on the ulnar side of the hand, thereby disturbing the quieter position that the ulnar side of the hand needs to be in. Further, the antebrachium or forearm is suspended in mid-air, placing a lot of tension on the muscles in the area, as well as the muscles in the upper arm, shoulder, neck, and scapula. This tension not only leads to overall muscle fatigue but contributes to a deterioration over time, of the accuracy with which the lines need to be painted during the cutting-in process, especially when the painters are amateurs. This, in turn, can lead to a whole host of time-consuming problems, including but not limited to, needing to redo the entire cutting-in process.

According to www.thespruce.com/accubrush-painting-tool-review-1822715 the contents of which are repeated, realleged and incorporated as if more fully set forth herein paint tool manufacturers have tried and failed for years to come up with a reasonably effective paint edger tool capable of overcoming the foregoing problems of fatigue and inaccuracy. In fact, www.spruce.com even went so far as to rate one of these tools, i.e., a foam painting edger as one of the 7 worst tools. "It smears, it goops, it drips. In short, it does everything but edge."

Another example of a paint tool proposed to solve the foregoing problems is U.S. Pat. No. 2,810,148 titled "Paint Applicator." It discloses a paint applicator whose primary objects were, among other things, to form a clear-cut, even borderline or edge for the paint on one of the two generally normal surfaces and running close to the corner there between; and to eliminate dependency on the skill, experience or steady hand of the operator to form the even paint borderline. It comprises a carriage including a frame having a flat side, a handle on said frame and a pair of spaced rollers on the side of said frame opposite from said flat side thereof, said rollers being arranged to turn about generally, parallel axes transverse to said flat side and having portions projecting outwardly beyond the marginal edge of said frame and a paint absorbent pad arranged on said flat side and having the edge of a marginal portion lying in a transverse plane which touches the crests of the projecting portions of said rollers and extends substantially perpendicularly to said flat side, whereby said edge of said pad is adapted to define a painted borderline on one of said surfaces and which is in substantial transverse alinement with an imaginary straight line tangent to and connecting said crests when said pad engages said one of said surfaces while said rollers roll on the other of said surfaces.

Still another example is U.S. Pat. No. 2,936,474 titled "Paint Applicator and Guide." It discloses a paint trim device whose primary objects were a) the enablement of anyone with average skill, using the device, to equal the work done by a master painter, while painting the adjoining faces of walls and ceiling of a room and b) the facilitation of the painting of a starter ribbon of color at the junction of a ceiling and a wall, while providing an efficient hand-rest, while painting said strip. The paint trim device comprises a plate serving as a platform and including a notch opening at its upper edge, rollers carried by said platform on said upper edge and having their peripheral portions disposed to contact a room ceiling, wall contacting rollers carried by and determining the plane of said platform and having their peripheral portions disposed at right angles to the room ceiling contacting rollers to stabilize the platform under hand pressure as the platform is moved in the angle formed by the wall and ceiling, a paint roller of substantially inverted frusto-conical shape having its peripheral portion exposed through said notch, a supporting shaft for said roller detachably secured to said platform, said shaft supporting the axis of said painting roller at an inclined angle to the platform in a manner whereby the periphery of the roller will contact the wall close to its right angular junction with the ceiling, and the top of the painting roller is inclined away from said ceiling.

Yet another example, is International Application Publication No. WO 2017/082727 A2 titled "Painting Tool and Method for the Purpose of Cutting In." It discloses a painting tool including a paint reservoir and a brush with brush hairs jointly defining a conical brush surface tapering in a sharp brush tip. It includes a paint supply tube and a nozzle with a supply channel in which the brush and the paint supply tube are fastened. In the brush, a brush channel is formed which is bounded by brush hairs and of which a distal end forms an opening in the brush surface. The paint supply tube extends in a proximal part of the brush channel. The brush hairs bounding the paint supply tube extend beyond the distal end of the paint supply tube and preferably by such a length that the brush hairs at a reduced pressure in the paint reservoir move towards each other so that the outlet opening of the paint supply tube is substantially closed off by the brush hairs. On the nozzle, an adjustable guiding element may be arranged for stable positioning of the brush tip with respect to the surface to be painted.

ACCUBRUSH, i.e., www.accubrush.com, is a publicly available product that allegedly allows its users to cut around doors, window frames, walls, and ceilings. As per U.S. Pat. No. 7,340,796 titled "Painting Apparatus", it comprises a roller applicator, a shield, a paintbrush, a handle, and a platform. The shield can rotate between a paint loading position and a paint application position. The handle is connected to the platform by a universal joint which allows the handle to be disposed at any angle relative to the platform, which, in turn, allows the painting apparatus to be used in conjunction with an extension pole in edging a wall along a ceiling without requiring the use of a ladder.

www.thespruce.com tried the ACCUBRUSH. They discovered that the device did not lap into the no-paint zone. Nonetheless, despite its manufacturer's promise, the device's nylon brush, meant to create edge, did not lay down a thick enough line. Due to the little nylon brush that follows the roller, a ¼" line was created between the thick coat of roller paint and the no-paint zone. This thin line was the same color as the roller color, but much lighter—nearly the color of the wall underneath. Sliding the ACCUBRUSH repeatedly back and forth only exacerbated the problem, because with every stroke they ran the risk of lapping paint into the no-paint zone.

Others, who also tried the device found that due to its design they still had to cut their corners. Further, because the device had to run against a flat surface, they could only cut in around casings and flat ceilings. see www.contractortalk.com/f8/accubrush-29842/.

As per www.thespruce.com, the only alternative to edging tools or masking tape is "somehow, miraculously, developing the expert hand for "cutting in." An expertise that takes years of practice to get right and as per www.thespruce.com rarely a viable option for do-it-your-selfers (DIYers). Accordingly, despite all of the prior art developments, there is still a need for a device that allows for the development of the expert hand for "cutting in", while significantly cutting back on the years of practice and the mounds of fatigue necessary to do so.

SUMMARY OF INVENTION

Accordingly, it is an object of the present invention to provide a device that allows for the development of an expert hand for "cutting-in" with paint or edging with a brush in preparation for painting a room with a roller.

It is another object of the present invention to provide a device that supports and steadies the ulnar side of the hand by leaning it against a wall of the room being painted, during the cutting-in-with-paint process.

It is yet another object of the present invention to provide a device that keeps the ulnar side of the hand in a flexed but quiet position during the cutting-in process, so as to provide a stable base of support for the radial side of the hand, holding the brush and allow it to move across ceiling lines and down wall lines quickly and efficiently.

It is still another object of the present invention to provide a device that steadies a painter's wrist, hand and arm during the cutting-in-with-paint process.

It is a further object of the present invention to provide a device that reduces muscle fatigue while insuring accuracy of lines being painted during a rapid cutting-in-with-paint process, even for painters who are amateurs.

In accordance with the present invention, there is provided a paint-edging, hand-steadying device capable of acting as a paint guide and comprising a hand-stabilizing support body having a top, an arcuate bottom, a proximate edge and a distal edge. The top is provided with two opposing shoulders, one shoulder being higher than the other, and a concave, arched surface between the two shoulders, which together with the shoulders forms an upwardly facing concave cradle extending between the two shoulders, said concave cradle having a length extending between said proximal edge and said distal edge along a lengthwise profile of said hand-stabilizing support body. In one embodiment the length of said cradle is sized to the approximate length of the ulnar aspect of the palm or heel of a human hand. Relative to said hand-stabilizing support body, said proximal edge is at the same height as said distal edge, such that placement of the ulnar aspect of the palm of a hand in the cradle is approximately, on a horizontal plane. The hand-stabilizing support body is provided with means to secure the paint-edging, hand-steadying device to the ulnar side or heel of the hand.

These and other objects, advantages, features, and characteristics of the invention will be apparent from the following description of the preferred embodiments, considered along with the accompanying drawings.

BRIEF DESCRIPTION OF THE DRAWINGS

It is believed that the present invention will be better understood from the following detailed description taken in conjunction with the accompanying drawings, in which the numerals represent identical elements and wherein.

LIST OF ELEMENTS AND THEIR RESPECTIVE IDENTIFYING NUMERALS

Figure 1:
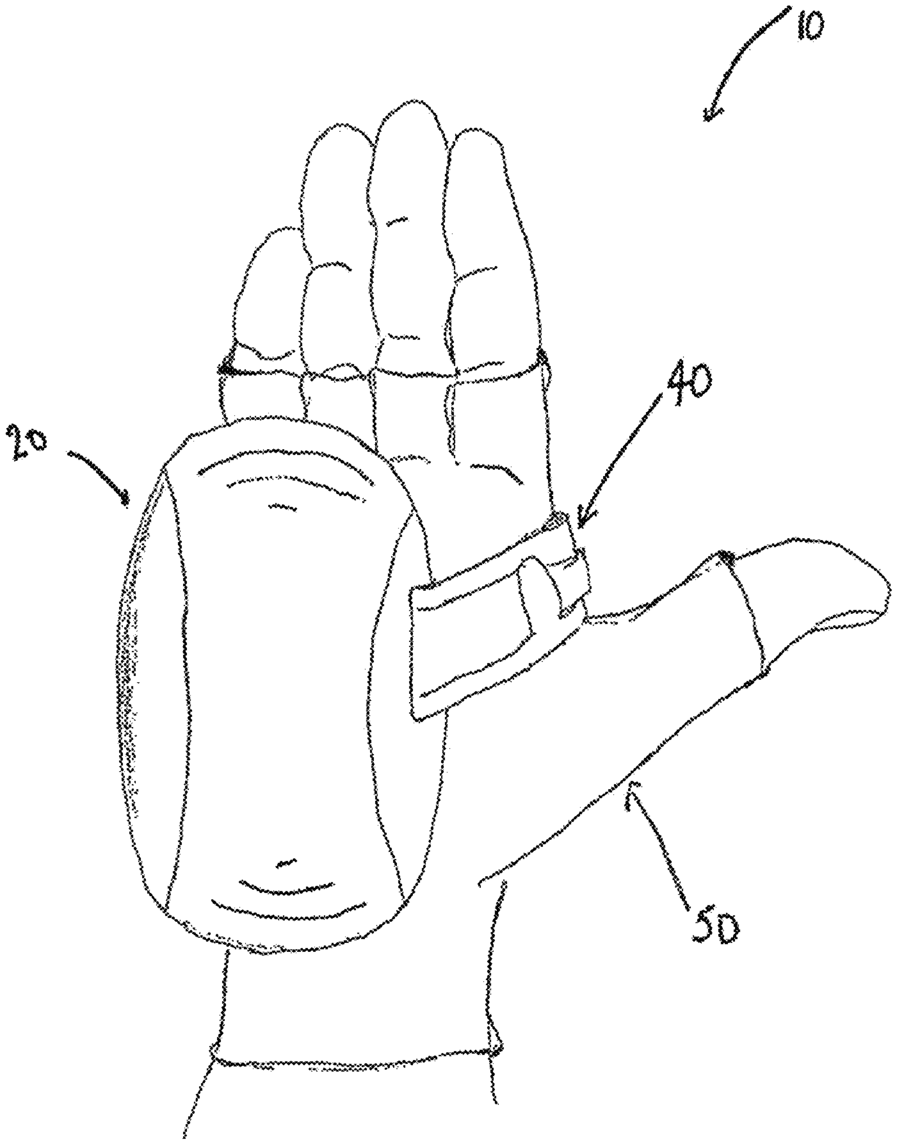
FIG. 1 is a three dimensional perspective of the inventive Paint-Edging, Hand-Steadying Device secured on the on the heel pad of a hand.

No Element
10 Paint-Edging, Hand-Steadying Device
20 Hand-Stabilizing Support Body
22 Top of Hand-Stabilizing Support Body
24 Proximate Edge of Hand-Stabilizing Support Body
26 Distal Edge of Hand-Stabilizing Support Body
27, 28 Opposing Shoulders of Hand-Stabilizing Support Body
29 Cradle
30 Pad
32 Arcuate Bottom of Hand-Stabilizing Support Body
34, 36 Side Faces of Hand-Stabilizing Support Body
40 Means for securing of Hand-Stabilizing Support Body to Painting Hand
42, 44 Ends of Means for Securing of Hand-Stabilizing Support Body
47, 48 Opposite Faces of Means for Securing of Hand-Stabilizing Support Body
49 Attachment Hardware
50 Glove
52 Hook and Loop Attachment Pads

DETAILED DESCRIPTION OF THE PREFERRED EMBODIMENT

Referring more specifically to FIGS. 1-22, they generally depict at 10, at least four different embodiments of the inventive paint-edging, hand-steadying device, i.e. the inventive paint guide. In use, it is secured on the heel pad of the hand of its user so that when the "cutting-in" process is begun, it supports the dynamic tripod of the painting hand, against the wall beneath the ceiling line being edged, or adjacent to the wall line or trim being edged. It also supports the forearm and the arm. This support allows for the quick development of an expert hand for "cutting-in-with-paint" quickly and efficiently. It reduces muscle fatigue, while at the same time it acts as a fulcrum for the steadying and movement of the painting hand to insure accuracy of lines being painted during a rapid cutting-in-with paint process; even for painters who are amateurs. It comprises at least one hand-stabilizing support body 20 and securing means 40 for securing said hand stabilizing support body 20 to the heel pad of the painting hand.

Said hand-stabilizing support body 20 of said inventive hand-steadying paint guide has a top 22, a proximate edge 24, a distal edge 26, an arcuate bottom 32 and two side faces 34 and 36. Said top 22 is provided with two opposing shoulders 27 and 28, one shoulder being higher than the other, and an arched surface between the two shoulders 27 and 28, so that the two shoulders and the arch to form an upwardly facing, concave cradle 29 having a width extending between said two shoulders 27 and 28, and a length extending between said proximal edge 24 and said distal edge 26 along a lengthwise profile of said hand-stabilizing support body 20. In one embodiment, the length of said upwardly facing cradle 29 is sized to approximately the length of the ulnar aspect or heel pad of a human hand. Relative to said hand-stabilizing support body 20, said proximate edge 24 is at the same height as said distal edge 26, such that placement of the heel pad of a hand in said cradle 29 is on a relatively horizontal plane that may be perpendicular to the radius of said arcuate bottom 32, and the tallest of the two shoulders abuts the outer edge of the heel pad of the painting hand. Optionally the upward face of the cradle 29 may be provided with a pad 30 for added comfort during use.

As shown in FIGS. 4-9 each of the side faces 34 and 36 are provided with at least one opening respectively. These openings are communicatingly connected with a through bore, such that an item such as a strap, or a strip of cloth, or a rope, or yarn can be threaded right through the support body 20. Alternatively, as shown in FIGS. 10-16 each of the side faces can be provided with attachment hardware.

In one embodiment of the inventive hand steadying device 10, said securing means for securing said support body to the heel pad of the painting hand comprises at least one strap 40 having a first end 42 and a second end 44 and two opposite faces 47 and 48. At least one of the two opposite faces 47 and 48 is covered with tiny loops. The first end 42 of said strap 40 is provided with tiny flexible hooks. The second end 44 of said strap 40 is provided with at least one attachment hardware, such as a slide, loop, or ring 49. Said strap 40 may be threaded through said support body 20. During use, the heel pad of the painting hand is placed in said cradle 29 such that the inner wall of said taller of its two opposing shoulders 27 and 28 is abutting the outer edge of the heel pad of the painting hand. Thereafter, said first end 42 of said strap 40 is a) threaded through and bent over one edge of said attachment hardware 49 bearing second end; b) pulled against the edge of said attachment hardware 49 to securely tighten the strap around the painting hand with its heel pad snug within the cradle 29; and c) thereafter pressed down onto the tiny loops on said at least one of said two opposing faces 47 and 48, to secure the support body in place on the painting hand. The tiny loops on said at least one of said two opposing faces 47 and 48, when pressed together with the hooks on said first end of said strap 40 interlock and bind to hold the strap in place and can be separated when pulled apart deliberately to remove the hand steadying device.

In another embodiment of the inventive hand steadying device 10, said securing means 40 for securing said support body to the heel pad of the painting hand comprises at least two straps 40, each strap having a first end 42 and a second end 44 and two opposing faces 47 and 48. At least one of the two opposing faces 47 and 48 is covered with tiny loops. The first end 42 of one of said straps 40 is provided with tiny flexible hooks. The first end 42 of the other of said straps 40 is provided with at least one attachment hardware, such as a slide, loop, or ring 49. Each of the second ends 44 of each of said straps 40 are respectively fixedly attached to each of attachment hardware provided on each of said side faces 34 and 36 of said support body 20, see FIGS. 11-16. During use, the heel pad of the painting hand is placed in said cradle 29 such that the inner wall of said taller of its two opposing shoulders 27 and 28 is abutting the outer edge of the heel pad of the painting hand. Thereafter, said first end 42 provided with tiny flexible hooks may be threaded through said at hardware attachment means of said first end 42 of the other of said straps 40, bent over one edge of said hardware attachment; b) pulled against the edge of said attachment hardware to securely tighten the straps around the painting hand with its heel pad snug within the cradle 29, and c) thereafter pressed down onto the tiny loops on said at least one of said two opposing faces 47 and 48, to secure the support body in place on the painting hand. The tiny loops on said at least one of said two opposing faces 47 and 48, when pressed together with the hooks on said first end of said strap 40 bind to hold the strap in place and can be separated when pulled apart deliberately to remove the hand steadying device.

Figure 2:
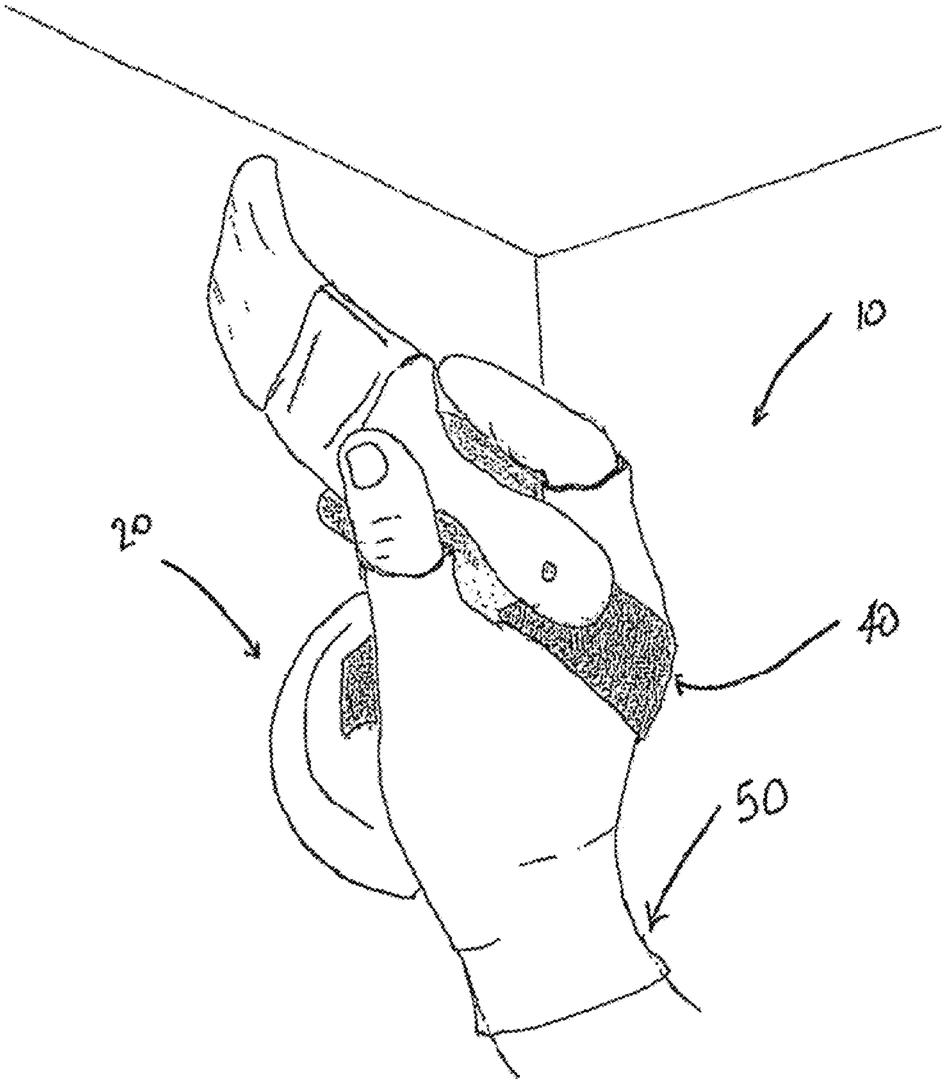
FIG. 2 is a three dimensional perspective of the inventive Paint-Edging, Hand-Steadying Device of FIG. 1, as it is being used to edge a wall with paint.
Figure 3:
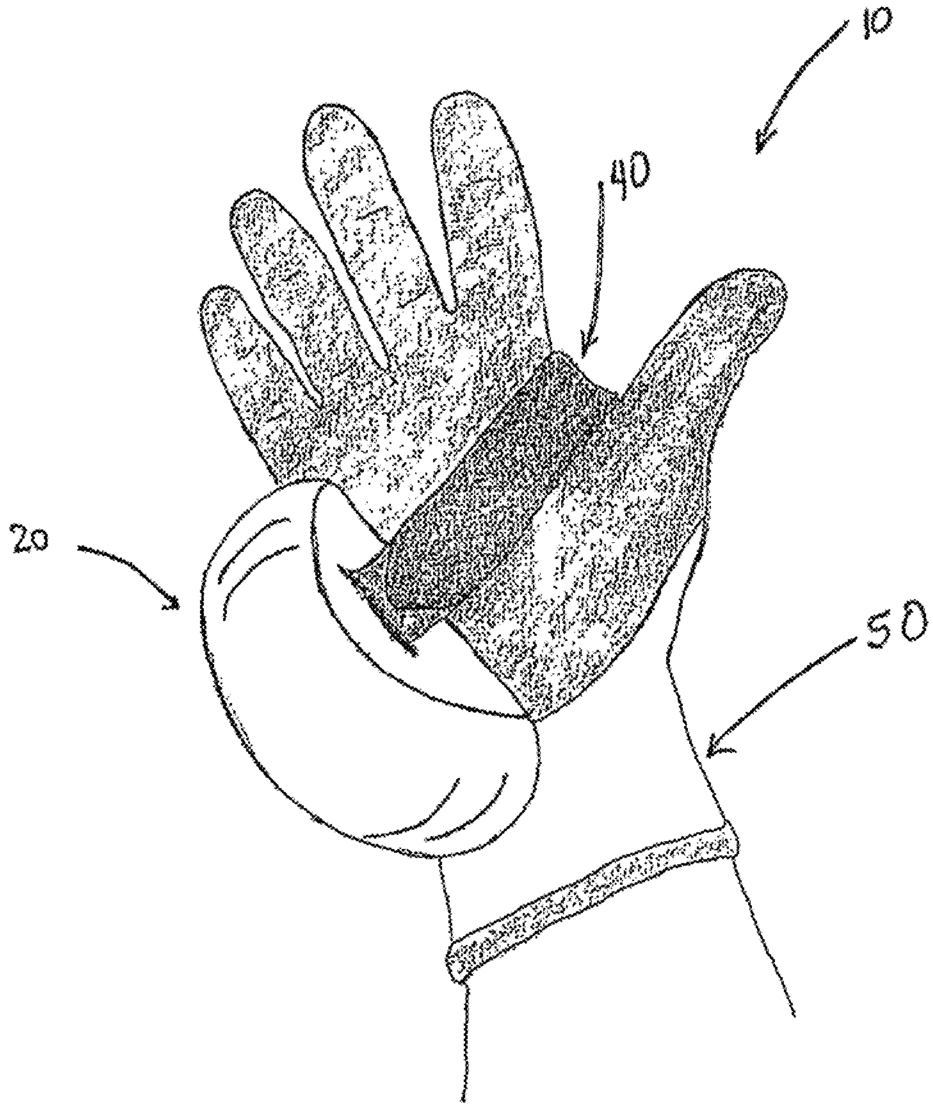
FIG. 3 is a three dimensional perspective of another embodiment of the inventive Paint-Edging, Hand-Steadying Device.
Figure 4:
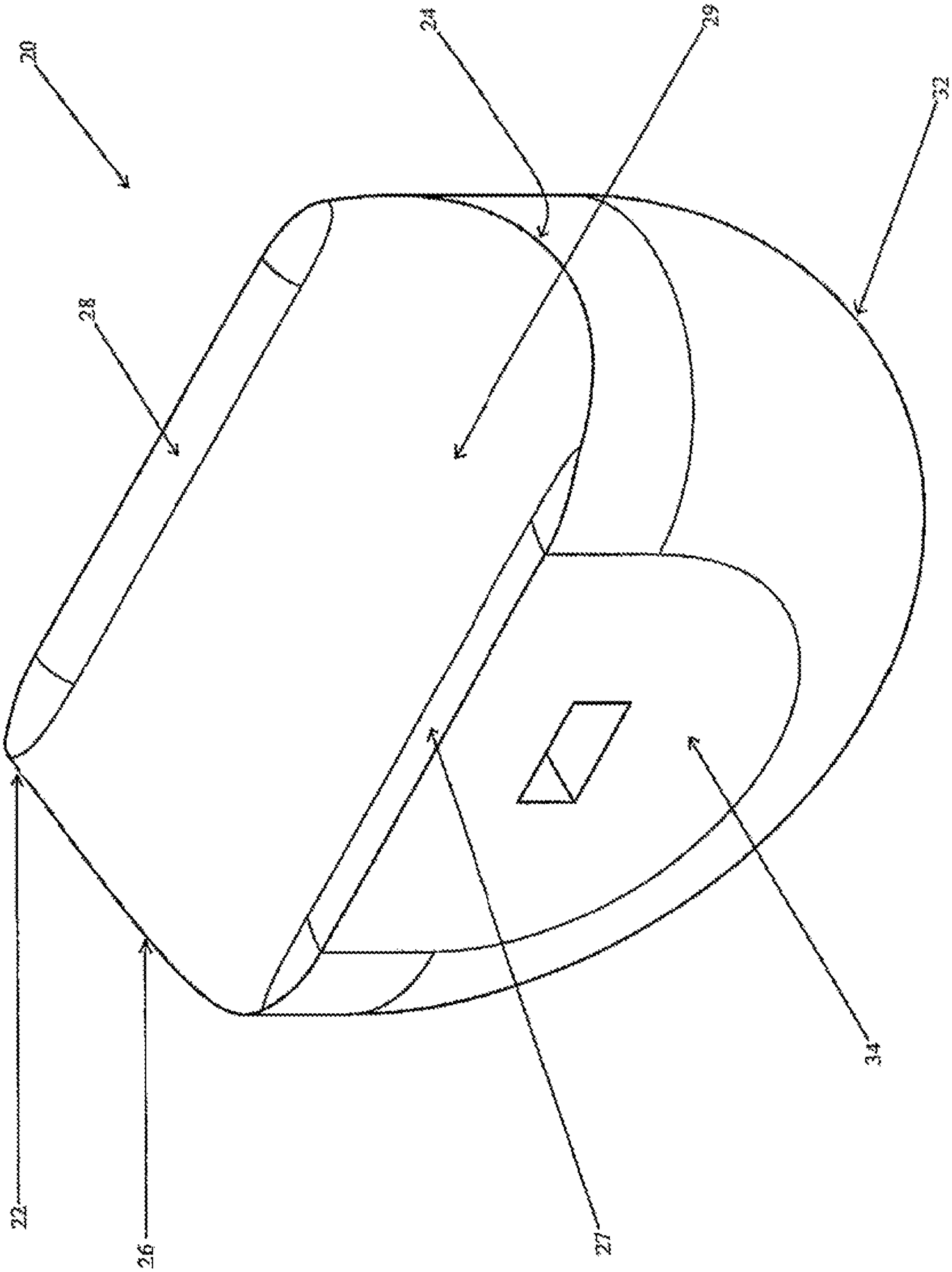
FIG. 4 is a first dimensional perspective of the support body of the inventive Paint-Edging, Hand Steadying Device depicted in FIGS. 1-3.
Figure 5:
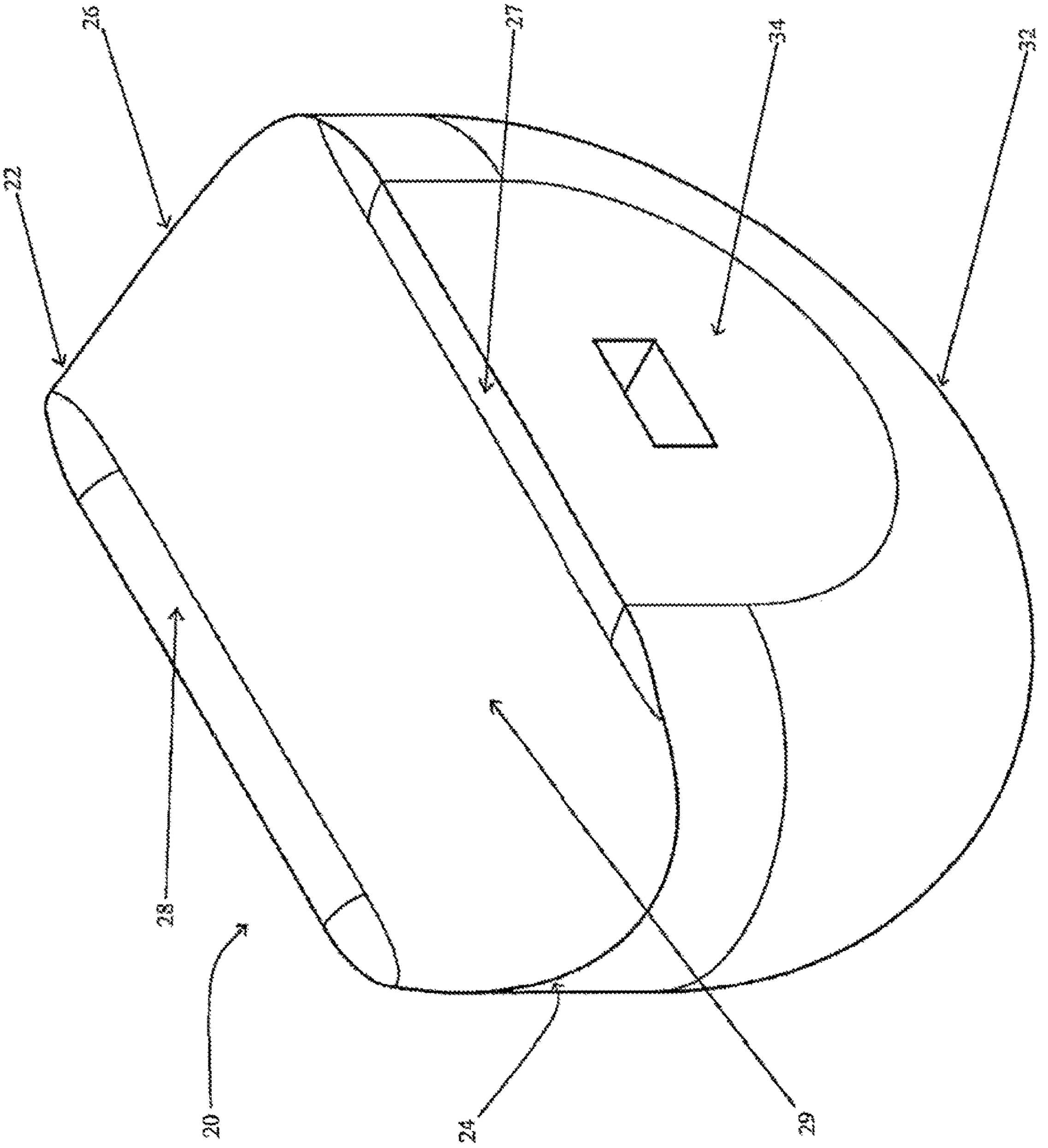
FIG. 5 is another three dimensional perspective of the support body of the inventive Paint-Edging, Hand-Steadying Device depicted in FIGS. 1-3.
Figure 6:
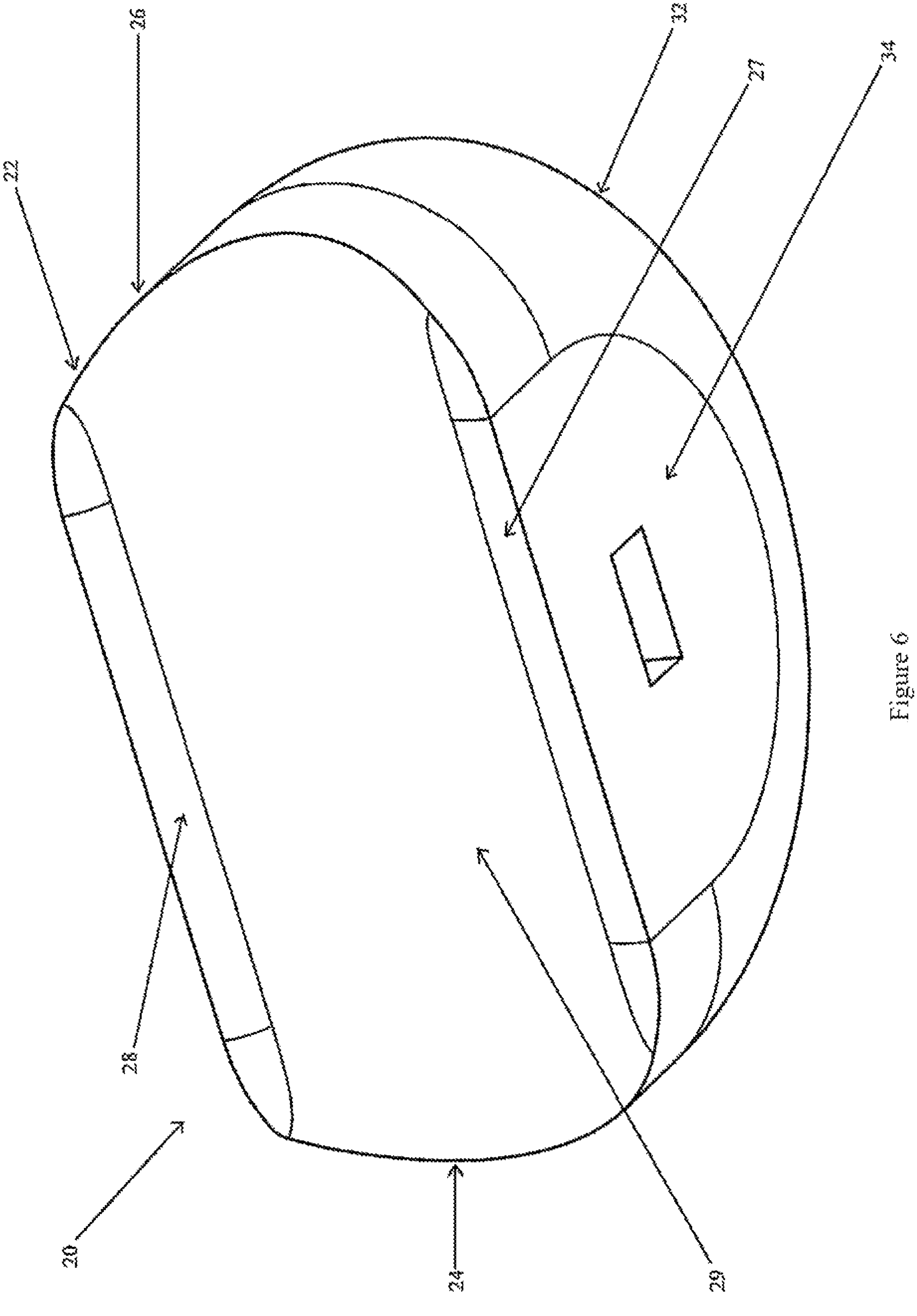
FIG. 6 is yet another three dimensional perspective of the support body of the inventive Paint-Edging, Hand-Steadying Device depicted in FIGS. 1-3.
Figure 7:
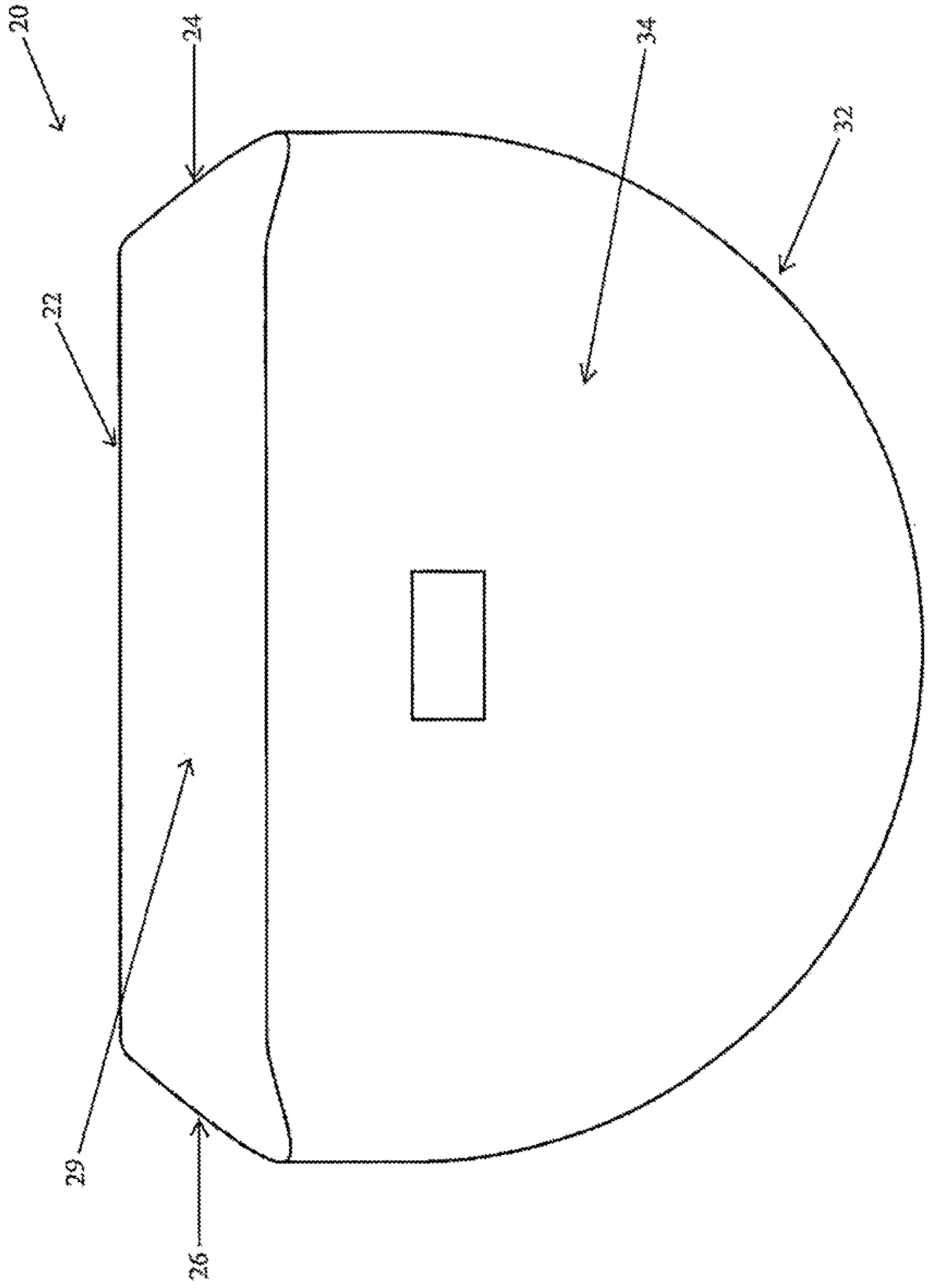
FIG. 7 is front view of the support body of FIGS. 4-6.
Figure 8:
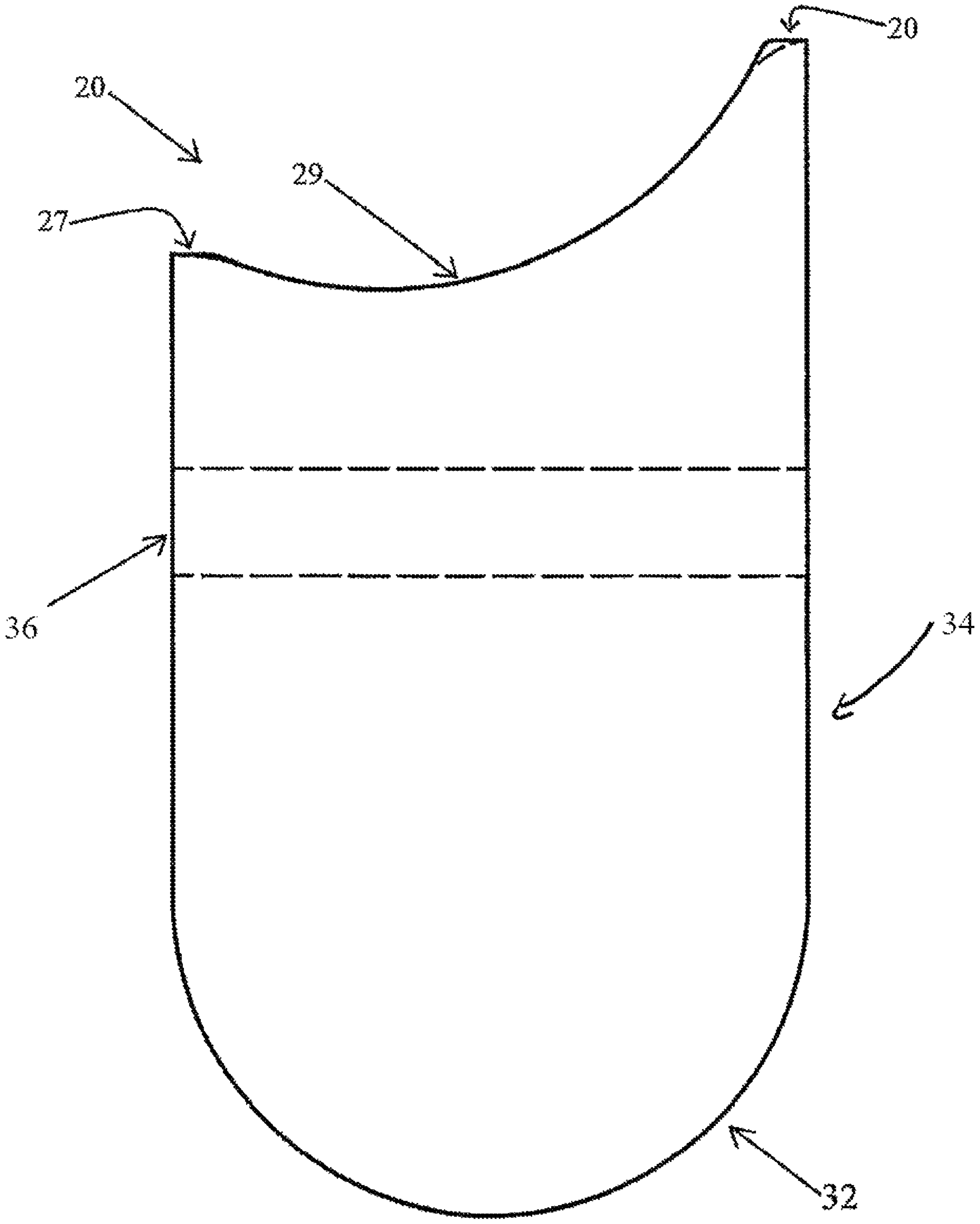
FIG. 8 is a side plan view of the support body of FIGS. 4-6.
Figure 9:
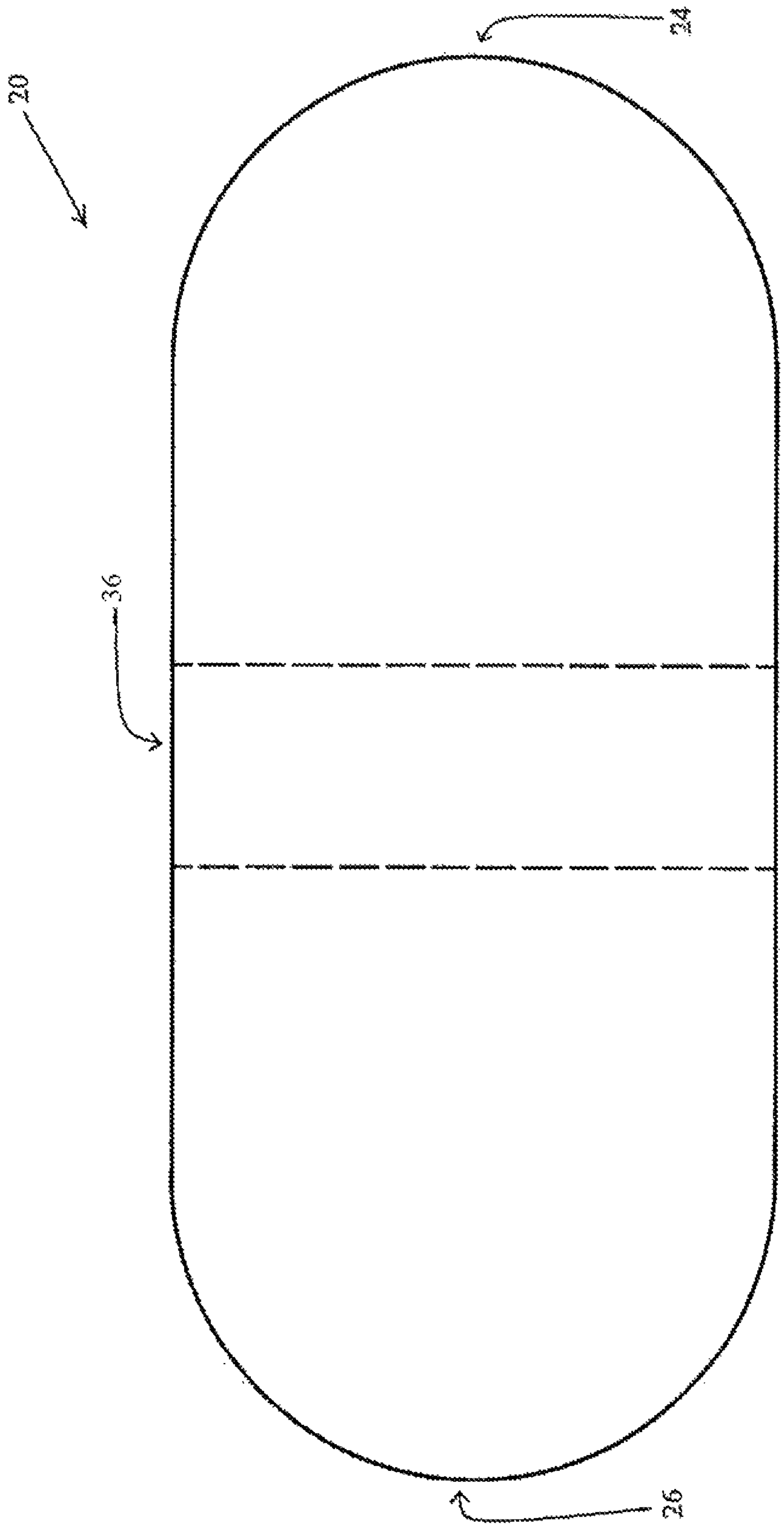
FIG. 9 is a bottom plan view of the support body of FIGS. 4-6.
Figure 10:
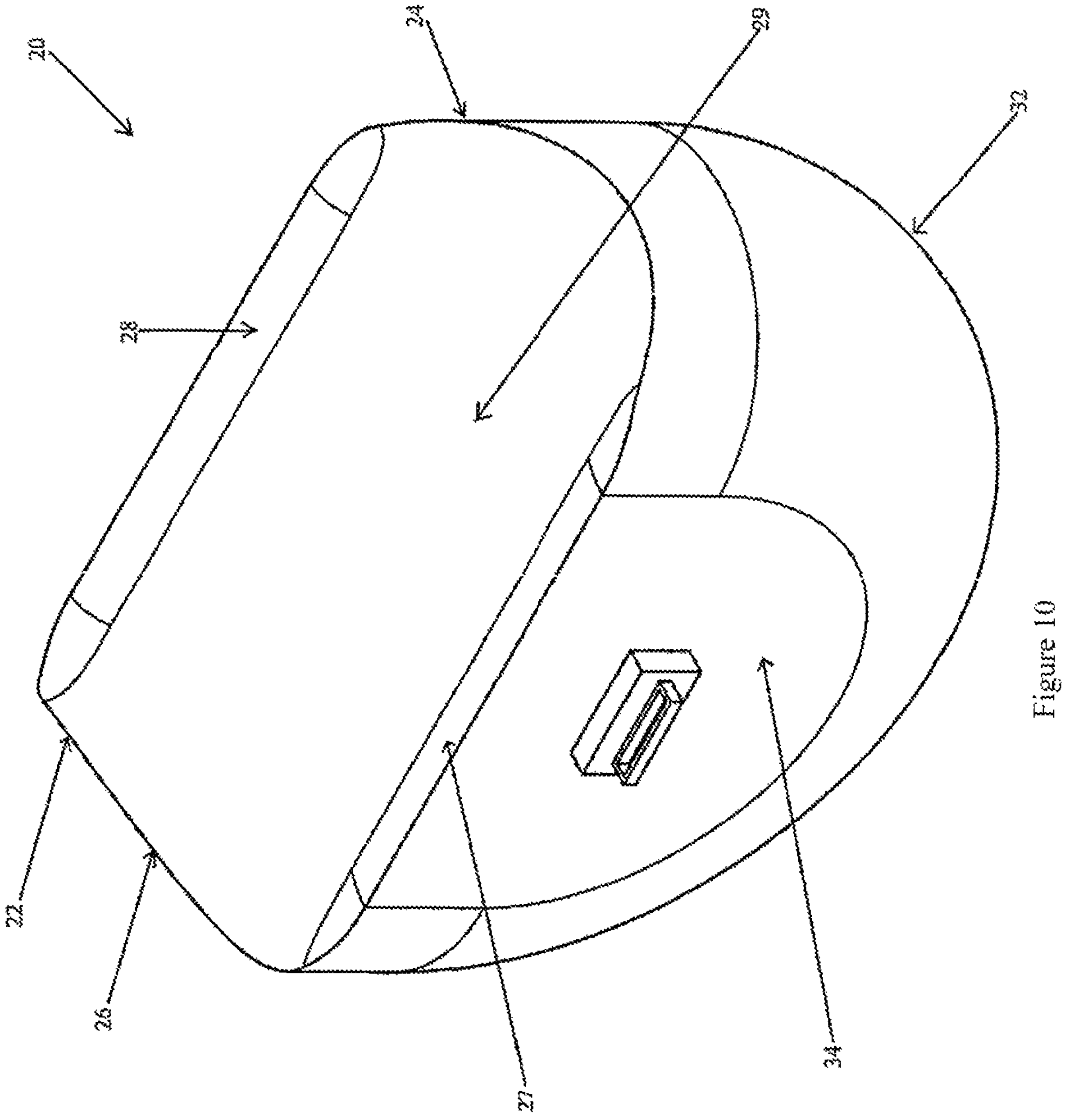
FIG. 10 is a three dimensional perspective of a second embodiment of the support body of the inventive Paint-Edging, Hand-Steadying Device depicted in FIGS. 1-3.
Figure 11:
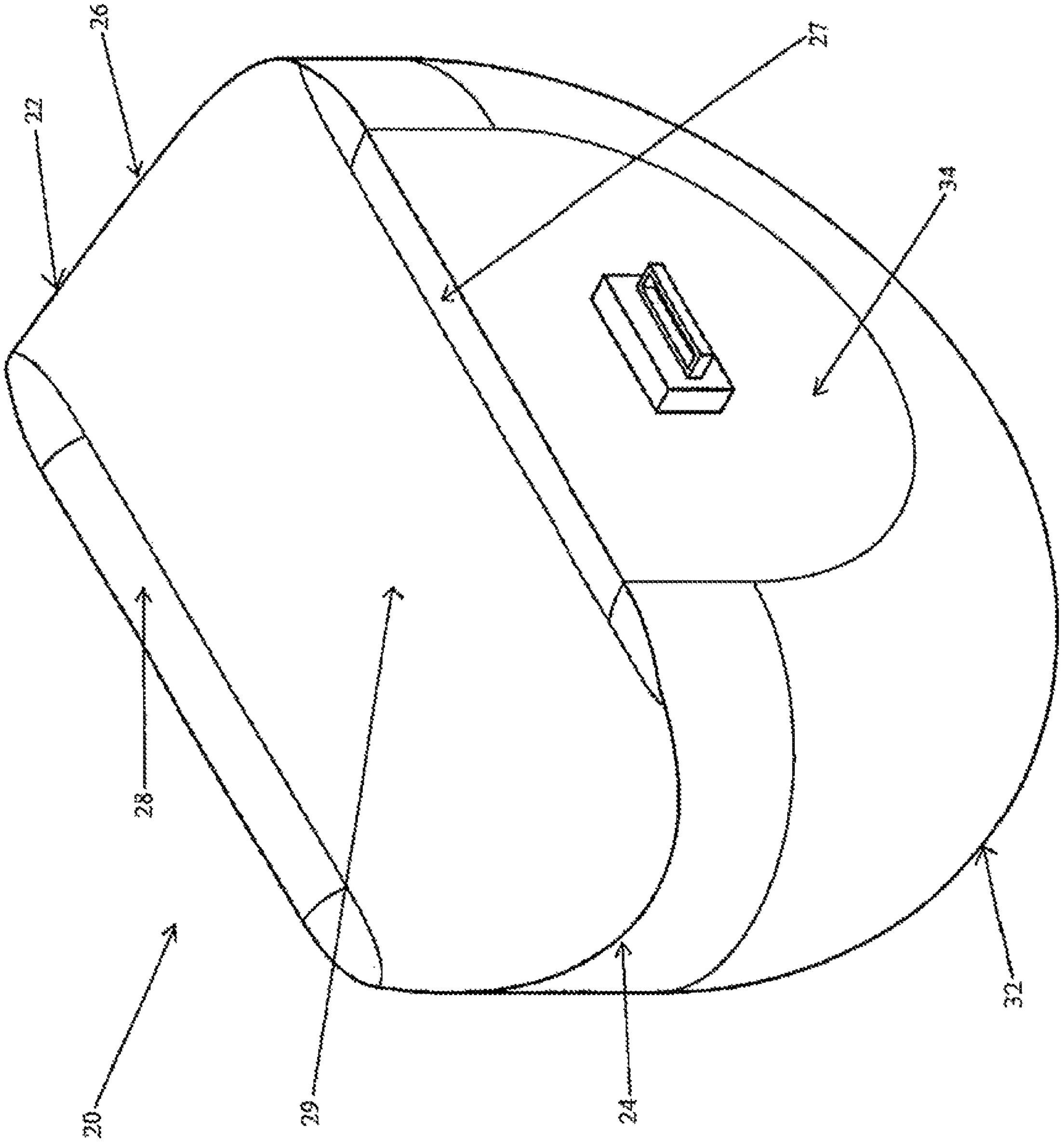
FIG. 11 is another three dimensional perspective of the second embodiment of the support body of the inventive Paint-Edging, Hand-Steadying Device depicted in FIGS. 1-3.
Figure 12:
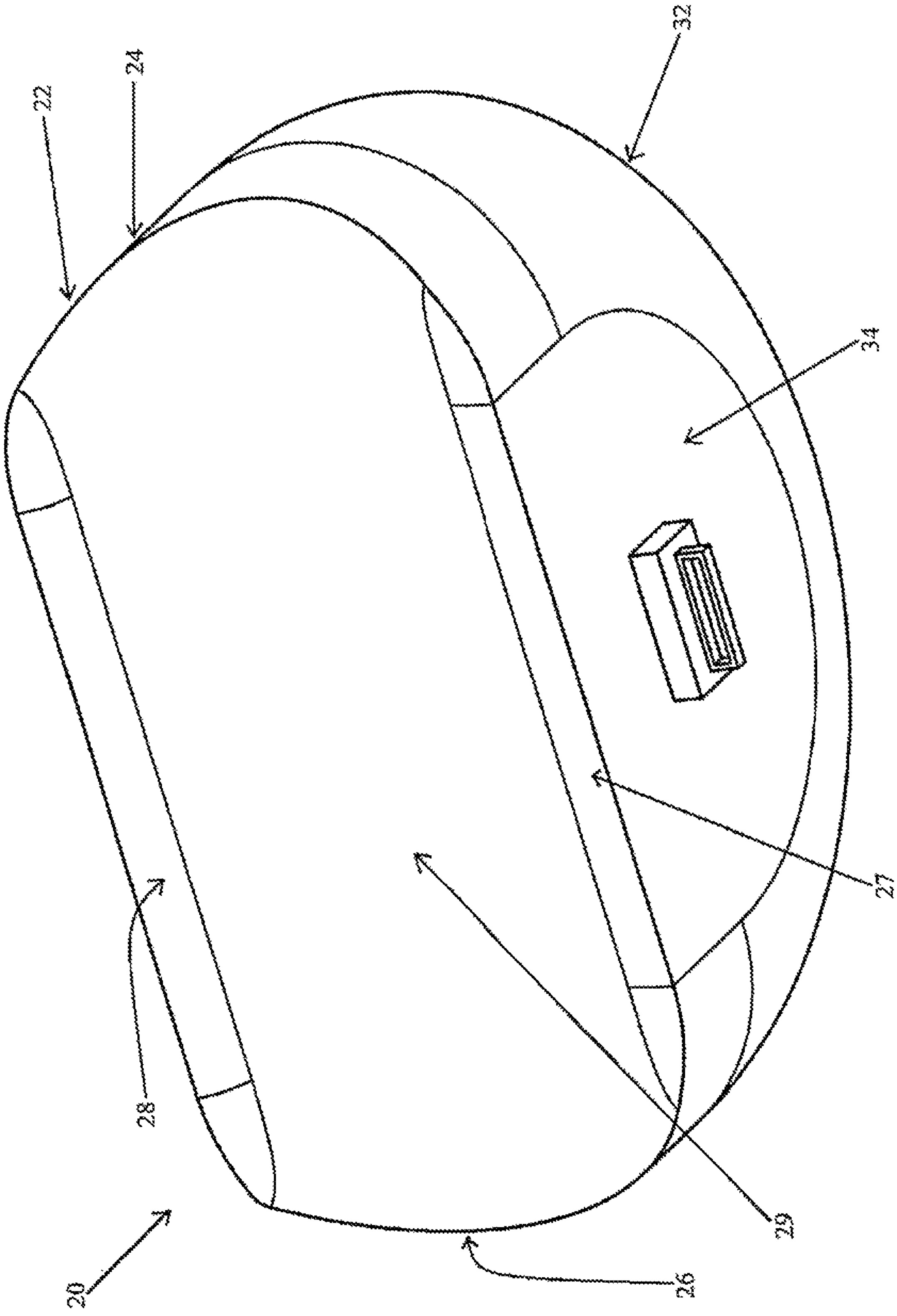
FIG. 12 is yet another three dimensional perspective of the second embodiment of the support body of the inventive Paint-Edging, Hand-Steadying Device depicted in FIGS. 1-3.
Figure 13:
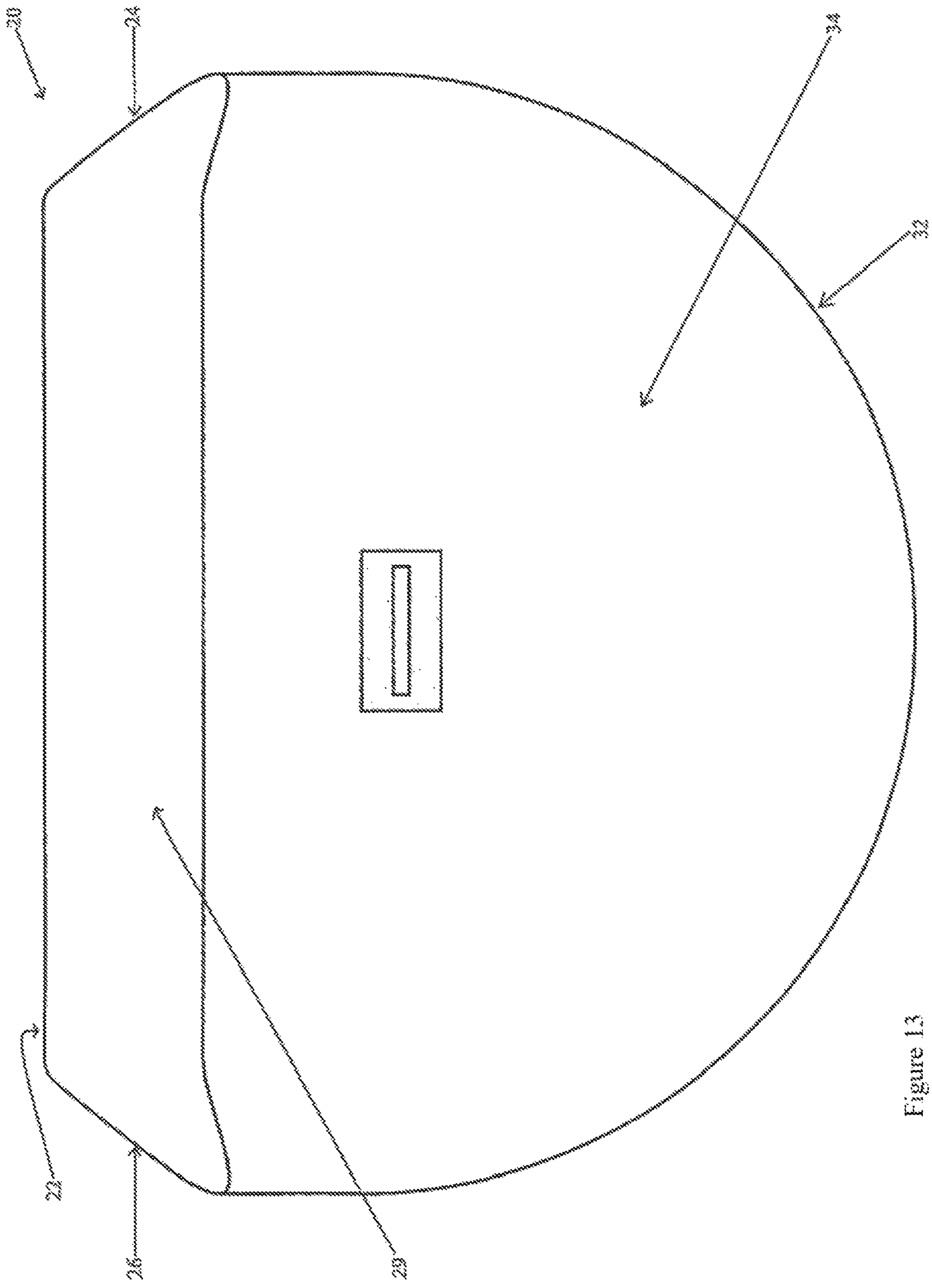
FIG. 13 is front view of the support body of FIGS. 10-12.
Figure 14:
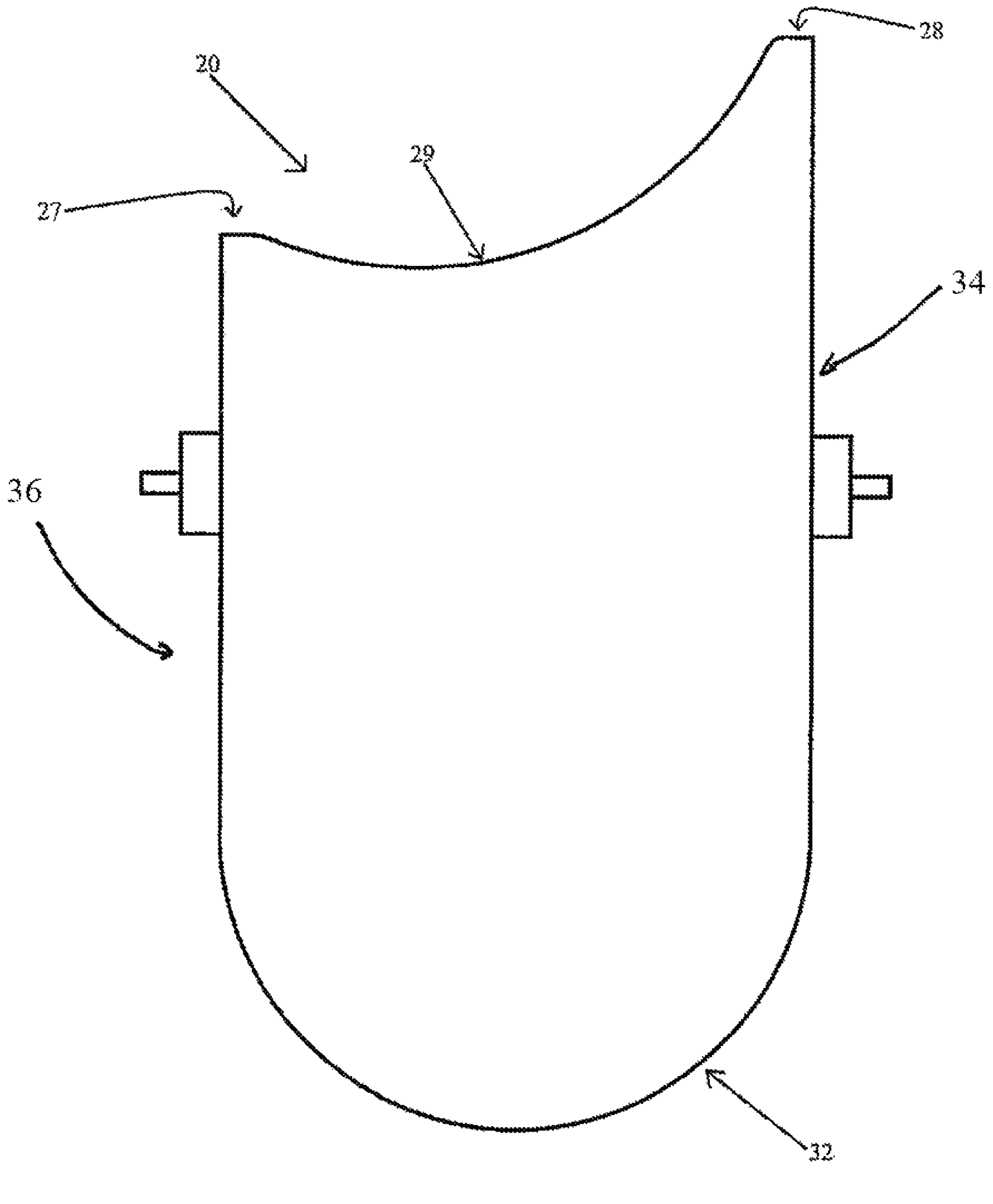
FIG. 14 is a side plan view of the support body of FIGS. 10-12.
Figure 15:
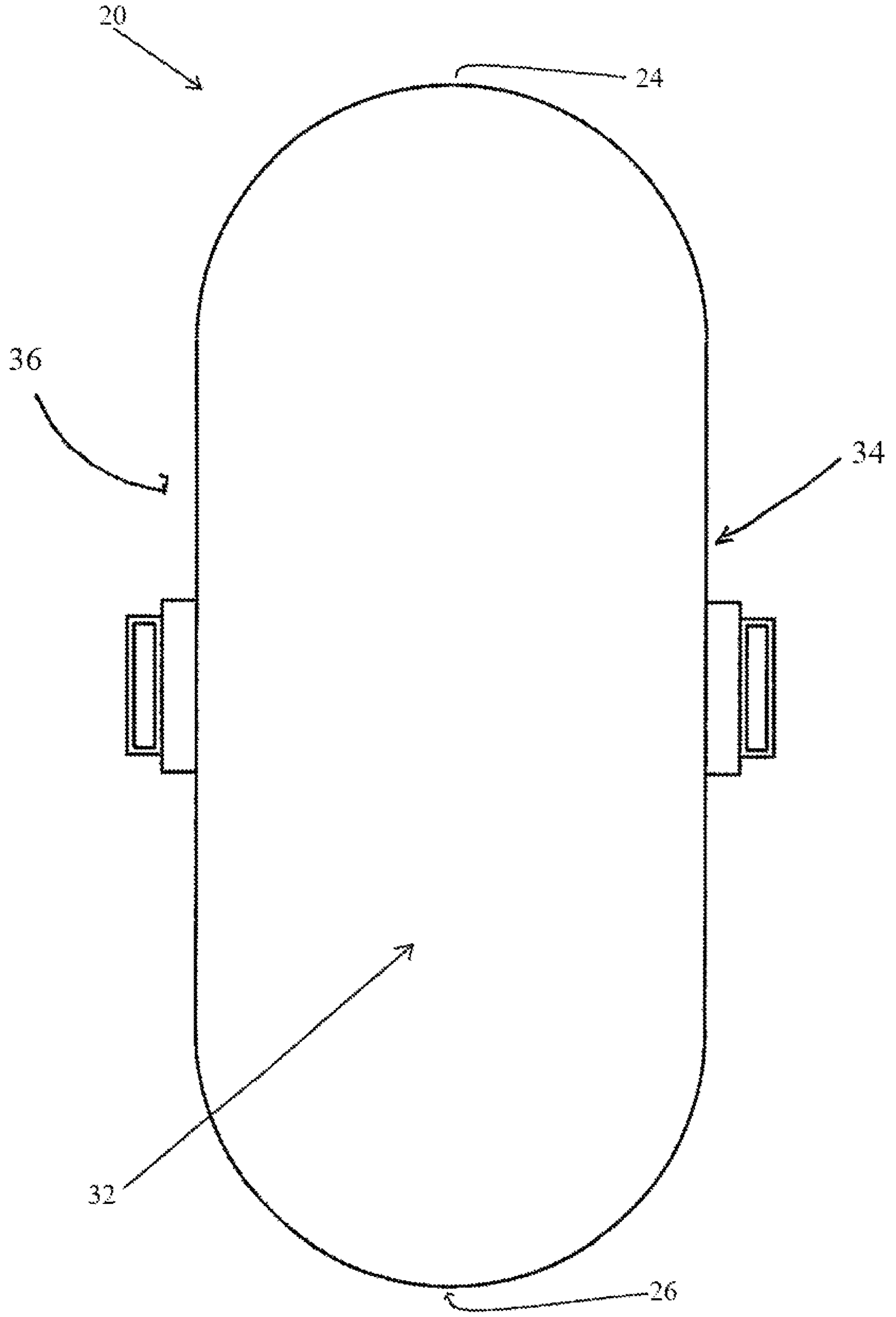
FIG. 15 is a bottom plan view of the support body of FIGS. 10-12.
Figure 16:
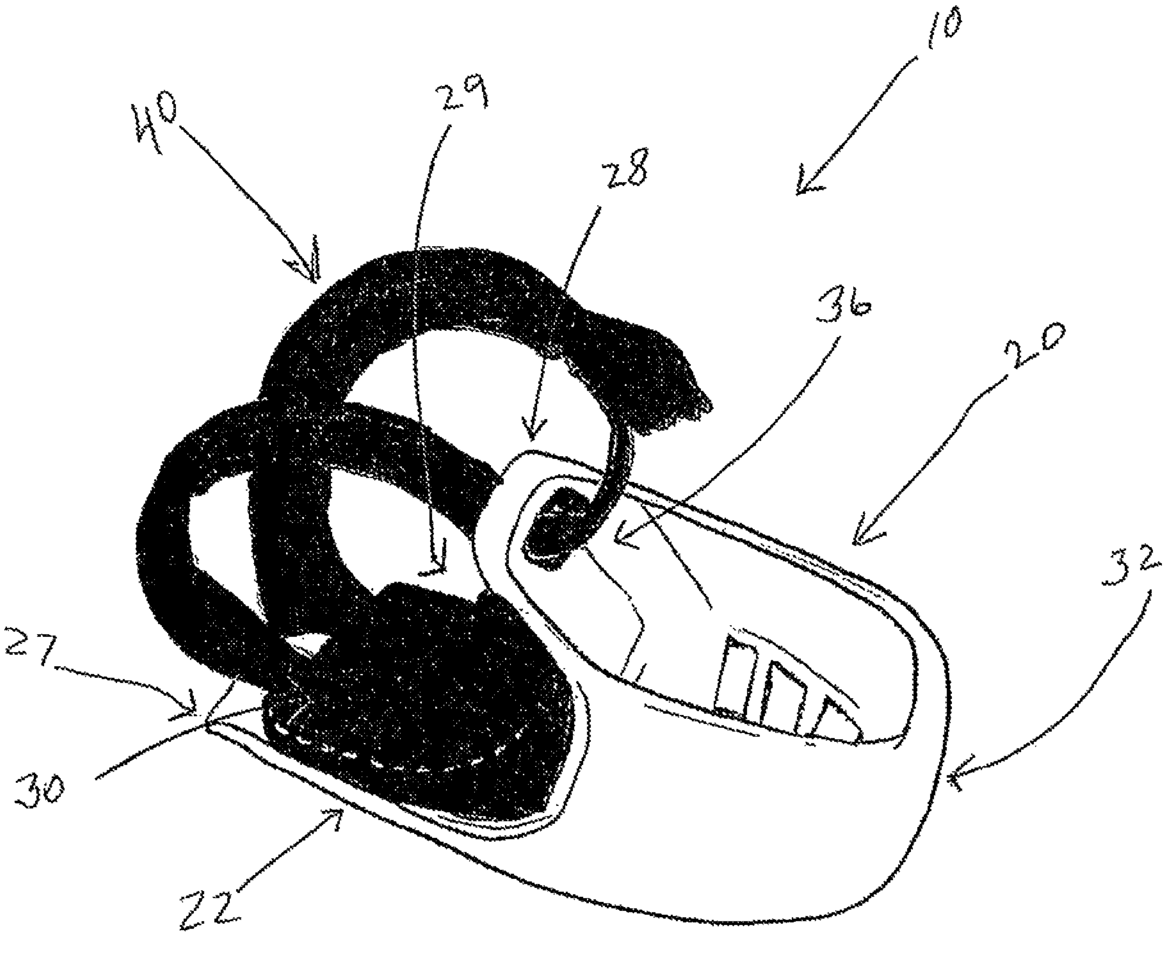
FIG. 16 is a three dimensional perspective of yet another embodiment of the inventive Paint-Edging, Hand-Steadying Device.
Figure 17:
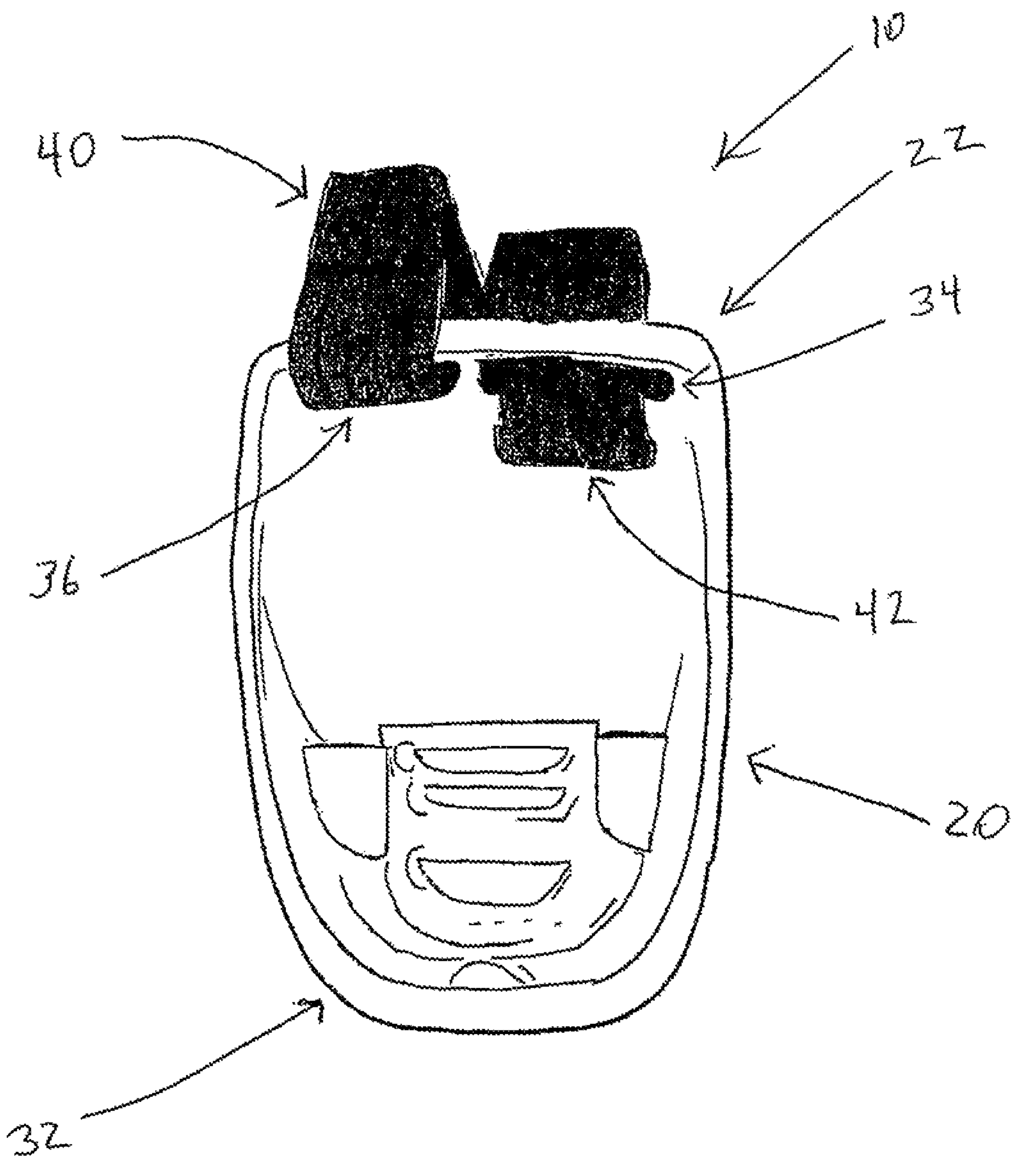
FIG. 17 is a one side view of the inventive Paint-Edging, Hand-Steadying Device of FIG. 16.
Figure 18:
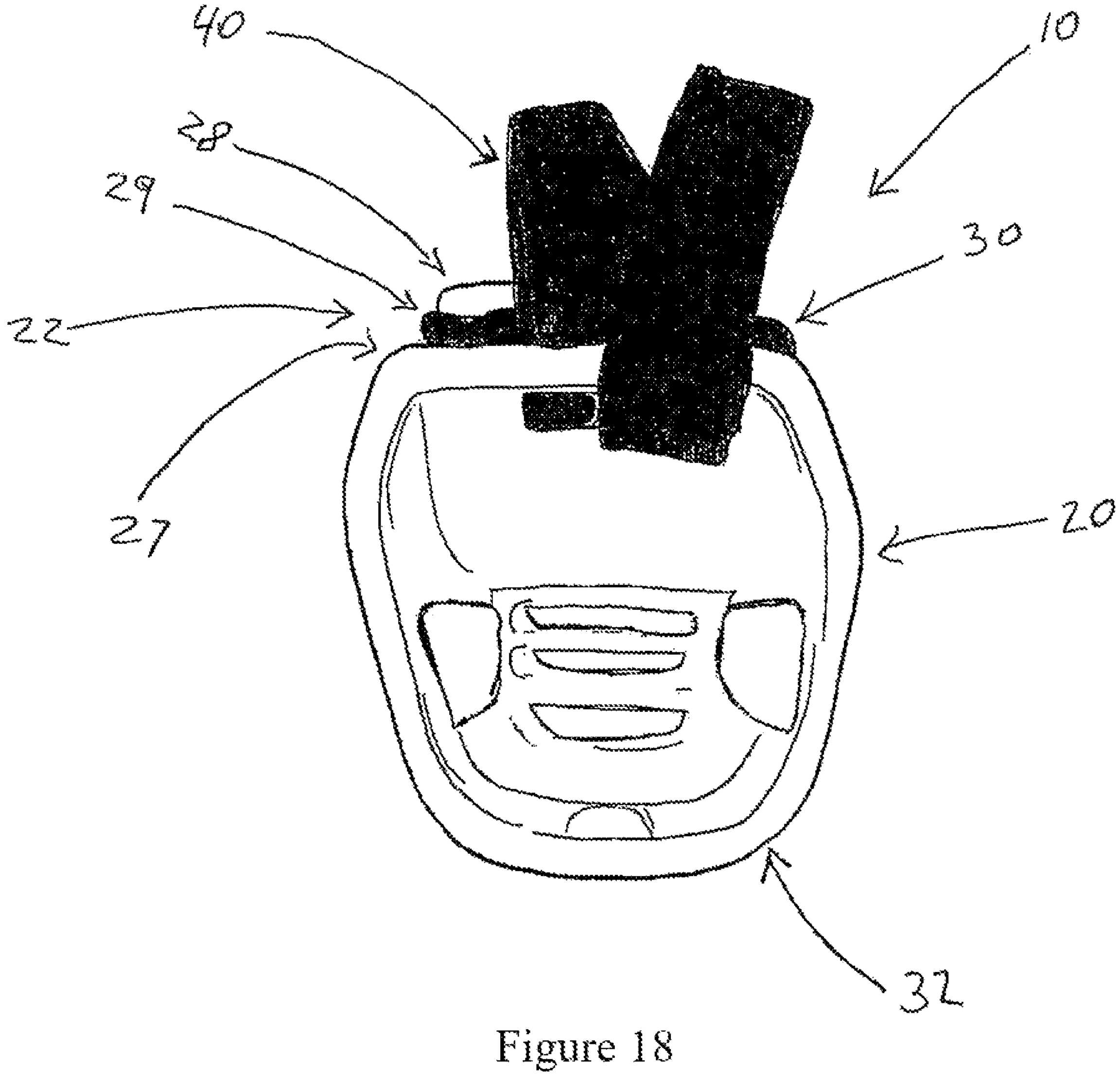
FIG. 18 is another side view of the inventive Paint-Edging, Hand-Steadying Device of FIG. 16.
Figure 19:
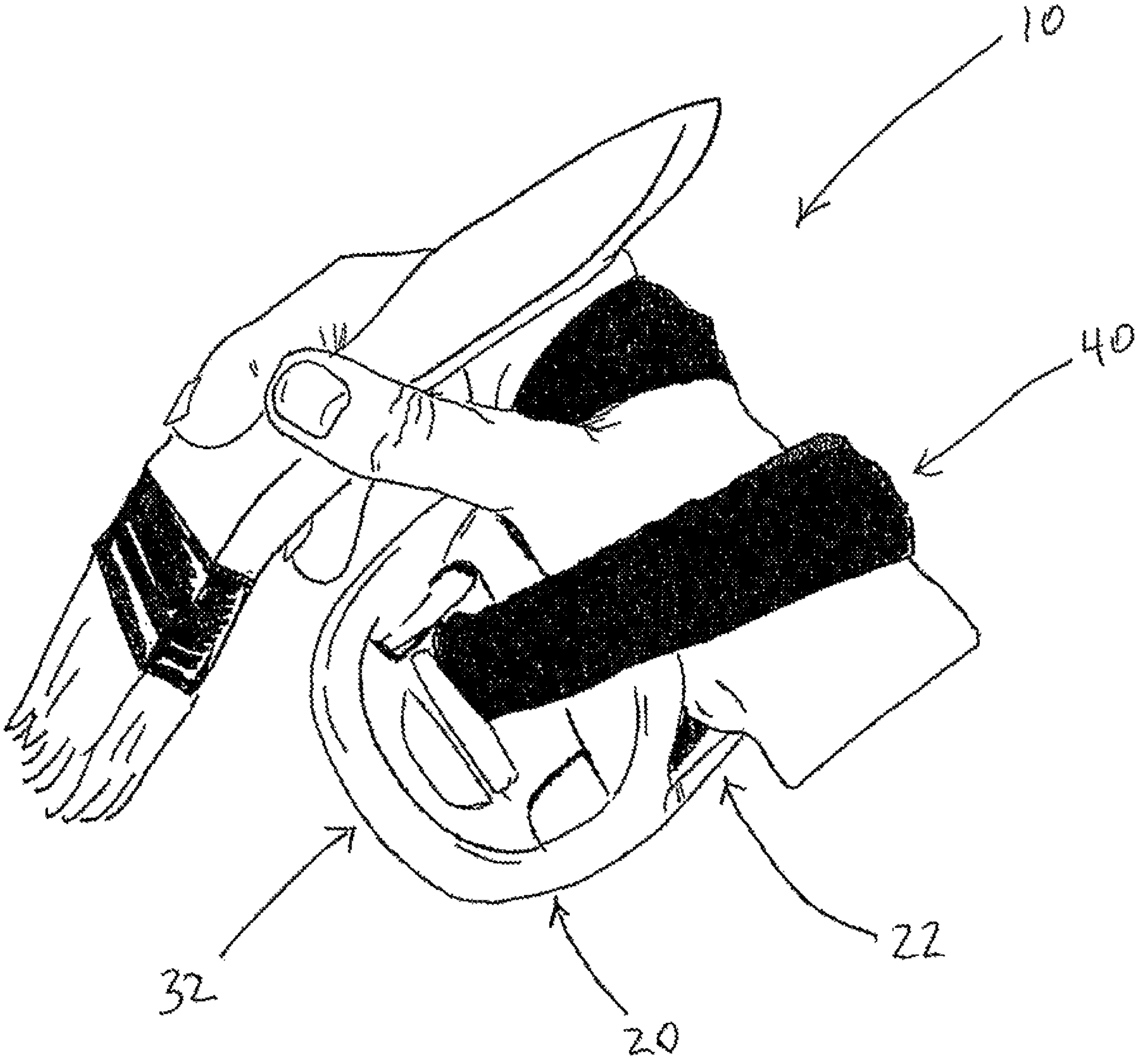
FIG. 19 is a three dimensional perspective of the inventive Paint-Edging, Hand-Steadying Device of FIG. 16 in use with a hand holding a brush.
Figure 20:
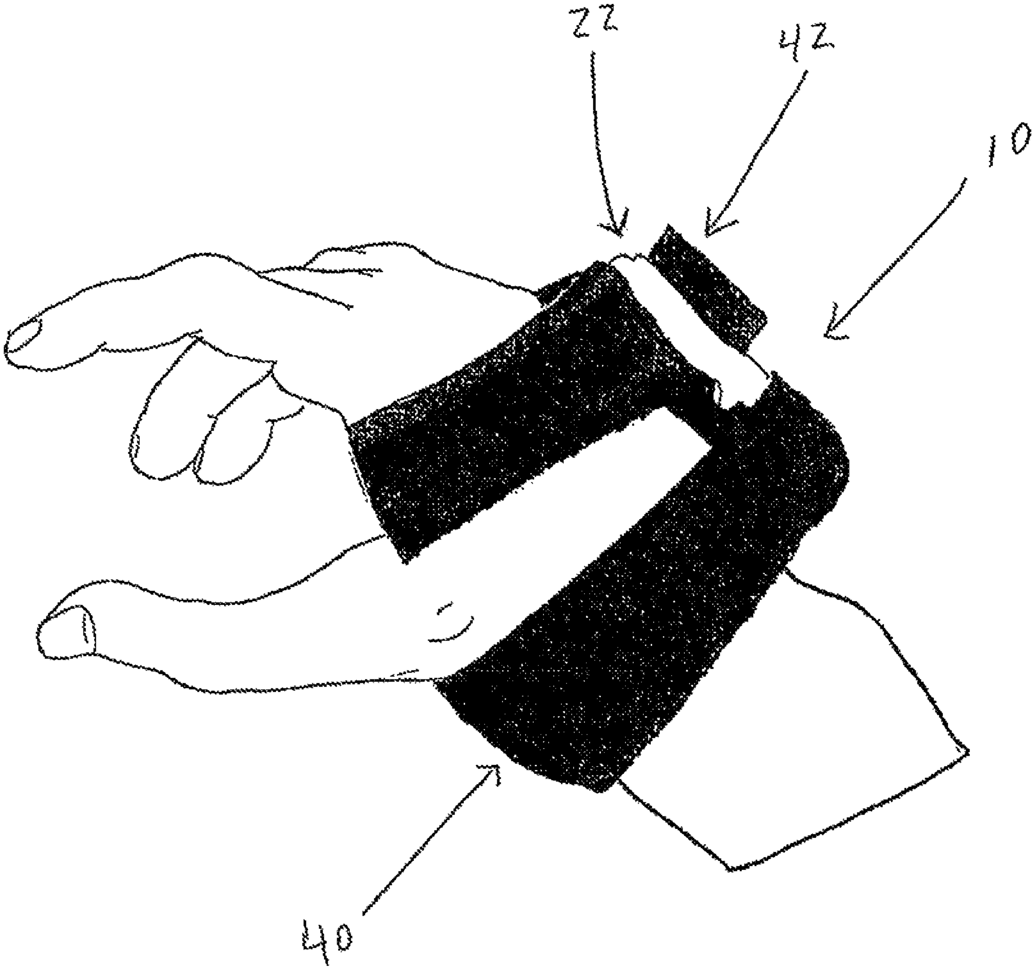
FIG. 20 is a side three dimensional perspective view of the inventive Paint-Edging, Hand-Steadying Device of FIG. 16 secured on the hand without holding a brush.
Figure 21:
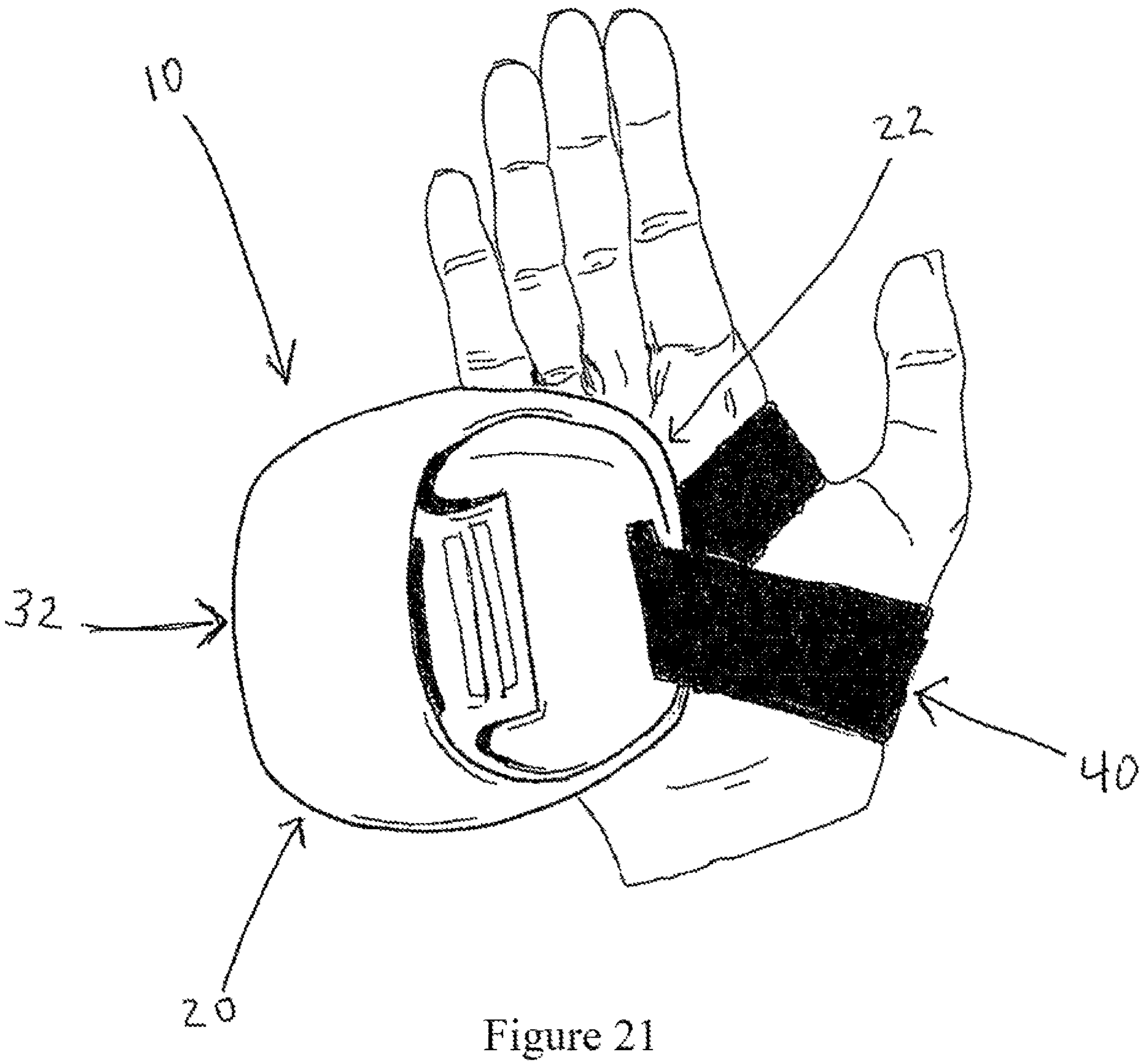
FIG. 21 is a bottom three dimensional perspective view of the inventive Paint-Edging, Hand-Steadying Device on the hand of FIG. 20 showing the Device's support of the ulnar side of the hand.
Figure 22:
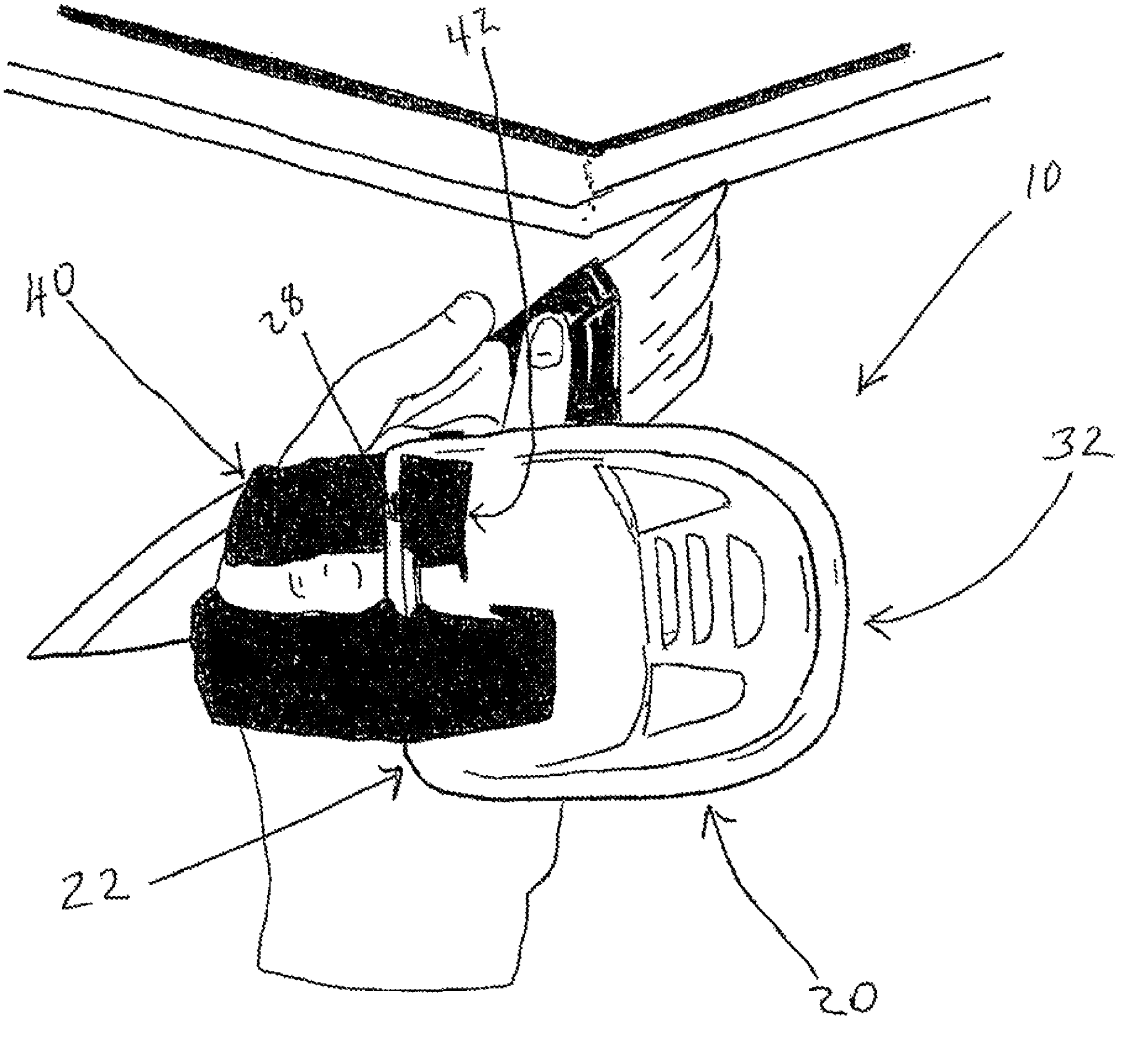
FIG. 22 is a three dimensional perspective view of the inventive Paint-Edging, Hand-Steadying Device of FIG. 16 as it is used to cut-in with paint in preparations for rolling.

The inventive hand steadying device 10 for use in "edging with a brush" or cutting-in with paint, in preparation of painting the walls and ceiling of a room with a paint roller may optionally, further comprise a glove 50, as shown in FIGS. 1-3. Said glove 50 in turn, may be provided with full finger-covering sections (see FIG. 3) or partial finger sections (see FIGS. 1-2) for better tactile feel of the brush during cutting with paint. In addition, said glove 50 is provided with loop or hook bearing attaching pads 52 corresponding to the hook or loop bearing faces 47 and/or 48 of said Means for Securing Support Body 40 on the one hand; and with a hook or loop bearing surface provided on the surface of said pad 30 within said cradle 29.

During use, the heel pad of the glove-bearing, painting hand provided with the loop or hook attachment surface is placed in, pressed, and secured against said hook or loop bearing surface of said pad 30 within said cradle 29 such that the inner wall of said taller of said two opposing shoulders 27 and 28 of support body 20 is securedly abutting the outer edge of the heel pad of the painting hand. Thereafter, said first end 42 of said strap 40 is a) threaded through and bent over one edge of said attachment hardware 49 bearing second end; b) pulled against the edge of said attachment hardware 49 to securely tighten the strap around the painting hand with its heel pad snug within the cradle 29; and c) thereafter pressed down onto the tiny loops on said at least one of said two opposing faces 47 and 48, to secure the support body in place on the painting hand. The other opposing loop bearing face is pressed against a corresponding hook bearing surface on the glove to better secure the inventive hand steadying device 10. The tiny loops on said at least one of said two opposing faces 47 and 48, when pressed together with the hooks on said first end of said strap 40 interlock and bind to hold the strap in place and can be separated when pulled apart deliberately to remove the hand steadying device.

The process of "cutting in with paint in preparation of rolling", with the present inventive Paint-Edging, Hand-Steadying Device 10, before painting an entire room using a roller, comprises a number of steps, including but not limited to: a) pouring about an inch or two of paint into a work bucket, from the paint container; b) optionally adding a little extender into the paint in the work bucket, if the paint is too thick; c) stirring the paint together with the extender to evenly distribute the extender throughout the paint, thereby creating a homogeneous paint mixture; d) securing the inventive Paint-Edging, Hand-Steadying Device 10 on the hand that will be holding the brush, with or without the glove 50, such that the heel pad of the hand is placed in said cradle 29, on a relatively horizontal plane that is perpendicular to at least one radius of said curved bottom face 32, and the tallest of the two shoulders 27 and 28 abuts the outer edge of the heel pad of the painting hand; e) loading the brush by dipping it into the paint/extender mixture in the work bucket, and thereafter taking some of the excess paint off, by tapping the brush or wiping it on the side of the work bucket back and forth; f) placing the brush at the ceiling line formed at the juncture of the wall and the ceiling (usually by using a ladder) and brushing along the ceiling line while simultaneously steadying the painting hand and arm and moving the body, through the action of the supporting body 20 as a fulcrum for the steadying and movement of the painting hand to insure accuracy of lines being painted during a rapid cutting-in-with-paint process.

There is no question that the hand steadying device 10 of the present invention, as described herein above, accomplishes all of its objectives. It allows for the development of an expert hand for "cutting-in" with paint or edging with a brush in preparation for painting a room with a roller. It supports and steadies the ulnar side of the hand by leaning it against a wall or other surface of the room being painted, during the cutting-in-with-paint process. It keeps the ulnar side of the hand in a flexed but quiet position during the cutting-in process, so as to provide a stable base of support for the radial side of the hand, holding the brush and allow it to move across ceiling lines and down wall lines quickly and efficiently. It steadies a painter's wrist, hand and arm during the cutting-in-with-paint process. It reduces muscle fatigue while insuring accuracy of lines being painted during a rapid cutting-in with paint process, even for painters who are amateurs.

While particular embodiments of the invention have been illustrated and described in detail herein, they are provided by way of illustration only and should not be construed to limit the invention. Since certain changes may be made without departing from the scope of the present invention, it is intended that all matter contained in the above description, or shown in the accompanying drawings be interpreted as illustrative and not in a literal sense. Practitioners of the art will realize that the sequence of steps and the embodiments depicted in the figures can be altered without departing from the scope of the present invention and that the illustrations contained herein are singular examples of a multitude of possible depictions of the present invention.

Accordingly, I claim:

1. A device capable of nestling a painting hand's heel pad and acting as a paint guide during a paint edging process, said device comprising a hand-stabilizing support body having a top heel pad receiving part and an arcuate bottom, said top part having a proximate edge, a distal edge, two opposing shoulders between said proximate edge and said distal edge, one shoulder being taller than the other, and an arched surface between said two shoulders, said arched surface and said opposing shoulders forming an upwardly facing concave cradle having a length that extends the length of said hand-stabilizing support body along its z-axis between said proximate and distal edges.

2. The device as recited in claim 1, wherein during use of the device for paint edging, the taller of said two opposing shoulders forming said upwardly facing concave cradle abuts the distal edge of the heel pad of the painting hand to support the ulnar section of the hand, during use.

3. The device as recited in claim 2, wherein the length of said upwardly facing concave cradle correlates to the length of the heel pad of the painting hand.

4. The device as recited in claim 3, further comprising means to secure said hand-stabilizing support body to the heel pad of the painting hand.

5. The device as recited in claim 3, wherein said hand-stabilizing support body is shaped as a half oblate spheroid.

6. The device as recited in claim 3, wherein said hand-stabilizing support body is shaped as a half spherical ellipsoid.

7. The device as recited in claim 1, wherein the length of said upwardly facing concave cradle correlates to the length of the heel pad of the painting hand.

8. The device as recited in claim 7, further comprising means to secure said hand-stabilizing support body to the heel pad of the painting hand.

9. A paint-edging, hand-stabilizing device capable of being secured on the heel pad of the hand of its user, to act as a fulcrum and support the dynamic tripod of the painting hand holding a paint brush against the wall beneath, adjacent, and above any wall, ceiling and floor line being edged comprising:

a. a hand-stabilizing support body having a top heel pad receiving part and an arcuate bottom, said top part having a proximate edge, a distal edge, two opposing shoulders between said proximate and said distal edge, said one shoulder of said two opposing shoulders being taller than the other said shoulder, and an arched surface between said two shoulders, said arched surface and said opposing shoulders forming an upwardly facing concave cradle having a length that extends the length of said hand-stabilizing support body along its z-axis from proximate edge to distal edge; and b. means for securing said hand-stabilizing support body to the heel pad of the painting hand.

10. A process of "cutting in with paint in preparation of rolling", before painting a room using a roller, comprising the following steps:

a. pouring about an inch or two of paint into a work bucket, from the paint container;

b. using securing means to fasten on the heel pad of the hand that will be holding the paint brush for the "cutting in with paint", a paint-edging, hand-steadying device having a hand-stabilizing support body with a top part and an arcuate bottom, two opposing shoulders, one shoulder being taller than the other, and an arched surface there between, said two opposing shoulders and said arched surface defining an upwardly facing cradle such that upon fastening, the heel pad of the hand is nestled within said cradle, the tallest of the two shoulders abuts the outer edge of the heel pad of the painting hand to support the ulnar section of the hand during the "cutting in with paint", and to allow the hand's thumb together with the index and middle fingers to extend beyond the proximate edge of the hand stabilizing support body and grasp the paint brush;

c. holding the brush by pinching it between the distal pads of the thumb and index finger and then resting the brush on the lateral distal interphalangeal joint of the middle finger;

d. loading the brush by dipping it into the paint in the work bucket;

e. placing the paint-dipped brush at the intersection corner formed by the two walls and the ceiling of a room;

f. resting the arcuate bottom of the hand-stabilizing supporting body beneath the brush, on and leaning slightly into the wall adjacent to the line formed by the wall and ceiling above it, to use the wall as support during the paint edging process; and g. brushing along the line using said hand-stabilizing supporting body as a fulcrum for the steadying by, and moving of the painting and horizontally along the wall being painted, to insure accuracy of lines while diminishing stress and fatigue on the painting arm and back.

11. The process as recited in claim 10, further comprising placing the paint-dipped brush at the intersection corner formed by the two walls and the ceiling of a room, resting the arcuate bottom of the hand-stabilizing supporting body beneath the brush, on and leaning slightly into the wall adjacent to the line formed by two walls, to use the wall as support during the paint edging process, and brushing along the line using said hand-stabilizing supporting body as a fulcrum for the steadying by, and moving of the painting hand vertically along the wall being painted, to insure accuracy of lines while diminishing stress and fatigue on the painting arm and back.

12. The process as recited in claim 10, further comprising placing the paint-dipped brush at the intersection corner formed by the two walls and the floor of a room, resting the arcuate bottom of the hand-stabilizing supporting body beneath the brush, on and leaning slightly into the wall adjacent to the line formed by two walls, to use the wall as support during the paint edging process, and brushing along the line using said hand-stabilizing supporting body as a fulcrum for the steadying by, and moving of the painting hand vertically along the wall being painted, to insure accuracy of lines while diminishing stress and fatigue on the painting arm and back.

13. The process as recited in claim 10, further comprising placing the paint-dipped brush at the intersection corner formed by the two walls and the floor of a room, resting the arcuate bottom of the hand-stabilizing supporting body beneath the brush, on and leaning slightly into the wall adjacent to the line formed by one wall and the floor, to use the wall as support during the paint edging process, and brushing along the line using said hand-stabilizing supporting body as a fulcrum for the steadying by, and moving of the painting hand horizontally along the wall being painted above the floor, to insure accuracy of lines while diminishing stress and fatigue on the painting arm and back.

14. The device as recited in claim 13, wherein said hand-stabilizing support body is shaped as a half oblate spheroid.

15. The device as recited in claim 13, wherein said hand-stabilizing support body is shaped as a half spherical ellipsoid.

16. A device capable of nestling a painting hand's heel pad and acting as a paint guide during a paint edging process, said device comprising a. a hand-stabilizing support body having a top painting hand heel pad receiving part and an arcuate bottom, said top painting hand heel pad receiving part having a proximate edge, a distal edge, two opposing shoulders between said proximate edge and said distal edge, one of the two opposing shoulders being taller than the other to abut the distal edge of the painting hand's heel pad and support the ulnar section of the painting hand during use, and an arched surface therebetween, said arched surface and said opposing shoulders forming an upwardly facing concave cradle having a length that extends the length of said hand-stabilizing support body along its z-axis between said proximate and distal edges, and correlates to the length of the heel pad of the painting hand; and b. means to secure said hand-stabilizing support body to the heel pad of the painting hand.

* * * * *